(12) United States Patent
Fuwa

(10) Patent No.: US 6,390,039 B2
(45) Date of Patent: May 21, 2002

(54) ENGINE VALVE DRIVE CONTROL APPARATUS AND METHOD

(75) Inventor: Toshio Fuwa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/879,229

(22) Filed: Jun. 13, 2001

(30) Foreign Application Priority Data

Jun. 29, 2000 (JP) ........................................ 2000-196120
Feb. 16, 2001 (JP) ........................................ 2001-040685

(51) Int. Cl.$^7$ ................................................. F01L 9/04
(52) U.S. Cl. .................. 123/90.11; 251/129.1; 251/129.2; 251/129.15; 251/129.16; 251/129.18
(58) Field of Search ....................... 251/129.18, 129.01, 251/129.02, 129.05, 129.16; 123/90.11

(56) References Cited

U.S. PATENT DOCUMENTS

| | | | | |
|---|---|---|---|---|
| 4,000,756 A | * | 1/1977 | Ule et al. ............... | 137/596.17 |
| 4,878,464 A | * | 11/1989 | Richeson et al. ......... | 123/90.11 |
| 5,645,019 A | * | 7/1997 | Liang et al. ............. | 123/90.11 |
| 5,647,311 A | * | 7/1997 | Liang et al. ............. | 123/90.11 |
| 5,868,108 A | * | 2/1999 | Schmitz et al. .......... | 123/90.11 |
| 6,285,151 B1 | * | 9/2001 | Wright et al. ............ | 318/560 |

* cited by examiner

Primary Examiner—Thomas Denion
Assistant Examiner—Ching Chang
(74) Attorney, Agent, or Firm—Kenyon & Kenyon

(57) ABSTRACT

A drive control apparatus and method control driving of an engine valve of an internal combustion engine based on electromagnetic force generated by a certain electromagnet. A controller of the apparatus sets a target drive velocity in accordance with a displacement of the engine valve, such that the target drive velocity corresponds to a velocity of the engine valve when there is no engine load. The controller then controls a magnitude of the electromagnetic force by controlling current applied to the electromagnet, depending upon a degree of separation between an actual drive velocity of the engine valve and the target drive velocity, so that the actual drive velocity is made substantially equal to the target drive velocity.

17 Claims, 11 Drawing Sheets

ENGINE VALVE DRIVE CONTROL APPARATUS AND METHOD

INCORPORATION BY REFERENCE

The disclosures of Japanese Patent Applications Nos. 2000-196120 and 2001-40685 filed on Jun. 29, 2000 and Feb. 16, 2001, respectively, including the specifications, drawings and abstracts, are incorporated herein by reference in its entirety.

BACKGROUND OF THE INVENTION

1. Field of the Invention

The invention relates to engine valve drive control apparatus and method for controlling driving of engine valves of an internal combustion engine based on electromagnetic force generated by electromagnets.

2. Description of Related Art

Valve drive apparatuses for driving engine valves, such as intake valves and exhaust valves, of internal combustion engines, by controlling electromagnetic force of electromagnets have been known. The valve drive apparatus of this type is desired to ensure high operating stability when driving the engine valves. Furthermore, it is desirable to minimize the amount of electric power that is consumed for driving the engine valves, and to suppress occurrence of noises upon opening and closing of each engine valve by reducing its drive velocity when the engine valve reaches either one of the opposite ends of its stroke (or a range of its displacement), namely, the fully closed position or the fully open position.

In a conventional apparatus as disclosed in Japanese Patent laid-open Publication No. 9-217859, the actual operating state of the engine valve is detected, and the electromagnetic force generated by an appropriate electromagnet is controlled so that the actual operating state coincides with a target operating state of the valve. In this manner, the electromagnetic force of the electromagnet is controlled to a magnitude that meets various requirements as mentioned above.

When controlling the electromagnetic force generated by the electromagnet, the apparatus as disclosed in the above-identified publication operates to determine a positional deviation between the actual position of an engine valve and a target position thereof (e.g., a fully open position or a fully closed position), and apply a controlled current to the electromagnet so that the resulting electromagnetic force has a magnitude suitable for displacing or moving the engine valve to the target position. If the positional deviation is large, for example, the exciting current applied to the electromagnet is increased so that the engine valve is opened or closed with accordingly increased electromagnetic force.

It should be noted, however, that the engine valves are subjected to external forces that vary depending upon the engine load. The external forces exerted on each engine valve are produced by, for example, the internal pressure (or in-cylinder pressure) within a corresponding combustion chamber, and the intake pressure or the exhaust pressure. Therefore, if the electromagnetic force of the electromagnet(s) is controlled based solely on information on the position of the engine valve in question (e.g., a positional deviation), the electromagnetic force may become insufficient when the drive force required to drive the engine valve is increased due to the influence of the external forces. In this case, the engine valve may not exhibit sufficiently high operating stability. If the electromagnetic force is set in advance to be sufficiently large so as to avoid the above situation, on the other hand, the engine valve may be driven by an excessively large electromagnetic force, depending on the condition of the engine load. This may result in increased power consumption, and occurrence of noise and vibrations at the time of opening and closing of the engine valve. In order to appropriately control the electromagnetic force for driving the engine valve, therefore, it is necessary to control electric current applied to the selected electromagnet in accordance with the engine load so that the influence of the external forces is taken into consideration.

To control current applied to the electromagnet in accordance with the engine load, it is necessary to obtain the relationship between the engine load and the electromagnetic force suitable for the engine load through experiments or the like, in addition to the information in the position of the engine valve, and to pre-set the relationship in the form of a control map, for example. Thus, it takes a great amount of time to perform operations to correlate control constants or parameters.

SUMMARY OF THE INVENTION

It is therefore an object of the invention to provide an engine valve drive control apparatus and method which enable an engine valve to be driven with an appropriate electromagnetic force that is controlled in accordance with the engine load, and which permits a significantly simplified operation to correlate control constants used for control of driving of the engine valve.

To accomplish the above and/or other object(s), one aspect of the invention provides a drive control apparatus for controlling driving of an engine valve of an internal combustion engine based on an electromagnetic force generated by at least one electromagnet. The apparatus includes a controller that sets a target drive velocity of the engine valve in accordance with a displacement of the engine valve, such that the target drive velocity corresponds to a velocity of the engine valve when there is no engine load. The controller then controls a magnitude of the electromagnetic force by controlling current applied to the electromagnet, depending upon a degree of separation between an actual drive velocity of the engine valve and the target drive velocity, so that the actual drive velocity is made substantially equal to the target drive velocity set by the setting unit.

When the drive force required to stably or reliably drive the engine valve changes in accordance with the external force that depends upon the engine load, the actual drive velocity deviates or separates from the target drive velocity that corresponds to the velocity of the engine valve in a no-engine-load state, because of the influence of the external force.

With the drive control apparatus constructed as described above, if the actual drive velocity deviates from the target drive velocity (in a no-engine-load state) due to the influence of the engine load, electric current applied to an appropriate electromagnet is controlled depending upon the degree of separation between the actual and target drive velocities. In this manner, the electromagnetic force of the electromagnet is controlled so that the actual drive velocity substantially coincides with the target drive velocity. Thus, even if the external force acting on the engine valve varies depending upon the engine load, the engine valve is driven with a suitably controlled electromagnetic force that corresponds to the engine load, so as to ensure opening and closing characteristics that are equivalent to those provided when there is no engine load. Furthermore, when controlling the electromagnetic force of the electromagnet depending upon the engine load as described above, there is no need to perform an operation to empirically determine the relationship between the engine load and the electromagnetic force suitable for the engine load, through experiments or the like. Rather, it is simply required to set the target drive velocity in a no-engine-load state in accordance with the displacement (or position) of the engine valve. It is, therefore, possible to greatly simplify an operation to correlate control constants.

BRIEF DESCRIPTION OF THE DRAWINGS

The foregoing and/or further objects, features and advantages of the invention will become apparent from the following description of preferred embodiments of the invention with reference to the accompanying drawings, wherein like numerals are used to represent like elements and wherein.

DETAILED DESCRIPTION OF PREFERRED EMBODIMENTS

First Embodiment

A first embodiment in which the invention is applied to a drive control apparatus for intake valves and exhaust valves of an internal combustion engine will be described.

In this embodiment, all of the intake valves and the exhaust valves are formed as electromagnetically driven valves that are opened and closed by using electromagnetic force generated by electromagnets. The intake valves and the exhaust valves are identical in construction and are controlled in the same manner when they are driven. In the following, therefore, the construction and operation of, for example, an exhaust valve will be described in detail.

Figure 1:
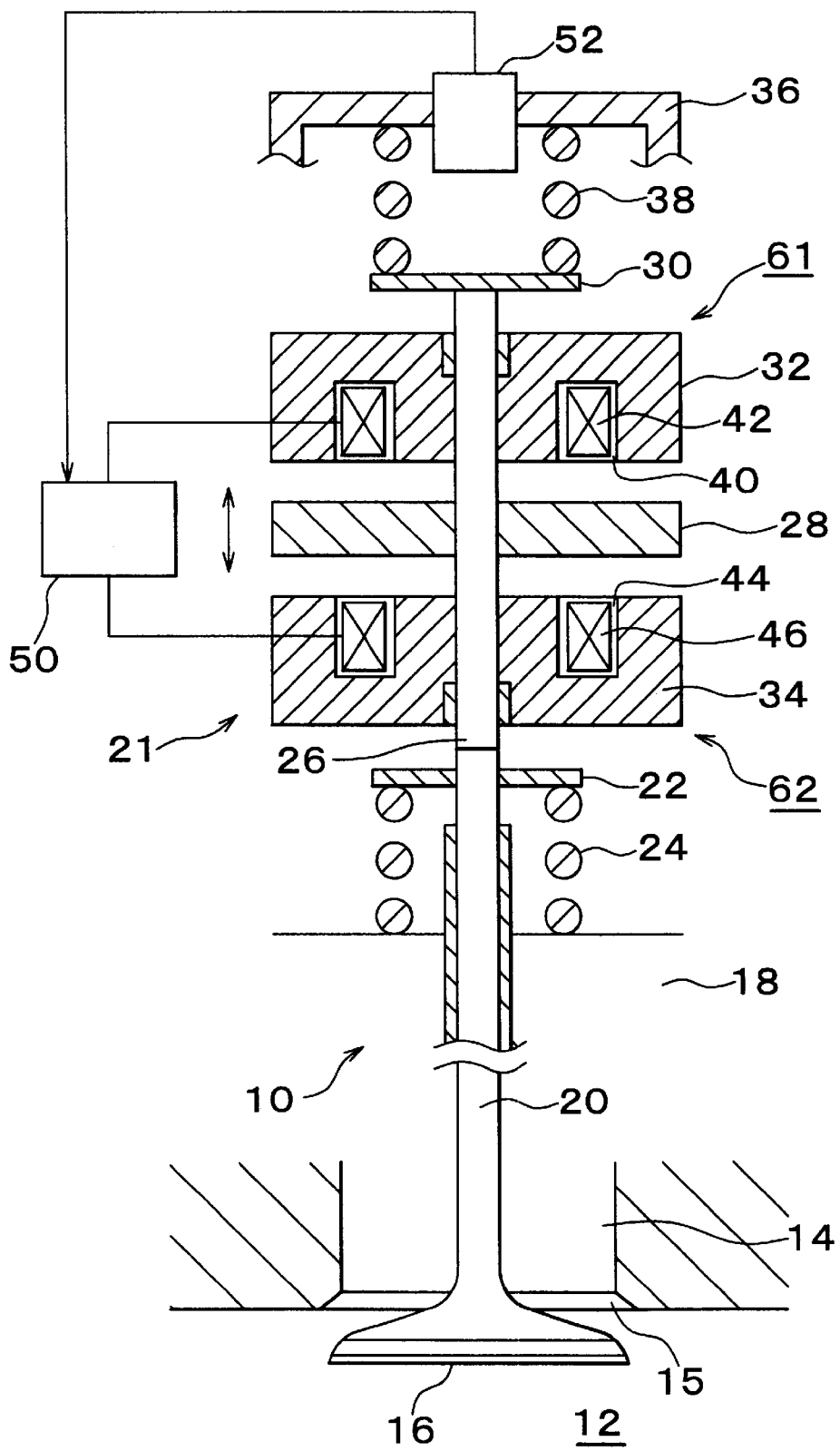
FIG. 1 is a schematic diagram illustrating an exhaust valve and a drive control apparatus thereof.

Referring to FIG. 1, an exhaust valve 10 includes a valve shaft 20, a valve body 16 provided at one of axially opposite ends of the valve shaft 20, and an electromagnetic drive portion 21 for driving the valve shaft 20. The valve shaft 20 is supported by the cylinder head 18 to be allowed to reciprocate by means of the electromagnetic drive portion 21. The cylinder head 18 has an exhaust port 14 that communicates with a combustion chamber 12 of the engine. A valve seat 15 is formed near an opening of the exhaust port 14. As the valve shaft 20 is reciprocated, the valve body 16 rests or abuts upon the valve seat 15 to close the exhaust port 14, and is moved away from the valve seat 15 to open the exhaust port 14.

A lower retainer 22 is provided on an end portion of the valve shaft 20 remote from the valve body 16. A lower spring 24 is disposed in a compressed state between the lower retainer 22 and the cylinder head 18. The valve body 16 and the valve shaft 20 are urged in a valve closing direction (i.e., upward in FIG. 1) under elastic force of the lower spring 24.

The electromagnetic drive portion 21 has an armature shaft 26 that is disposed coaxially with the valve shaft 20. A disc-like armature 28 made of a high-magnetic-permeability material is fixed to a substantially middle portion of the armature shaft 26, and an upper retainer 30 is fixed to an end of the armature shaft 26. The other end of the armature shaft 26 remote from the upper retainer 30 abuts on the end portion of the valve shaft 20 provided with the lower retainer 22.

In a casing (not shown) of the electromagnetic drive portion 21, an upper core 32 is fixedly positioned between the upper retainer 30 and the armature 28, and a lower core 34 is fixedly positioned between the armature 28 and the lower retainer 22. Each of the upper core 32 and the lower core 34 is made of a high-magnetic-permeability material, and assumes an annular shape. The armature shaft 26 extends through a central portion of each annular core 32, 34 such that the shaft 26 can reciprocate relative to the cores 32, 34.

An upper spring 38 is disposed in a compressed state between the upper retainer 30 and an upper cap 36 that is provided in the casing. The elastic force of the upper spring 38 urges the armature shaft 26 toward the valve shaft 20. In turn, the armature shaft 26 urges the valve shaft 20 and the valve body 16 in a valve opening direction (i.e., downward in FIG. 1).

A displacement sensor 52 is attached to the upper cap 36. The displacement sensor 52 outputs a voltage signal that varies in accordance with the distance between the displacement sensor 52 and the upper retainer 30. It is thus possible to detect a displacement of the armature shaft 26 or the valve shaft 20, that is, a displacement of the exhaust valve 10, based on the voltage signal of the displacement sensor 52.

An annular groove 40 having a center located on the axis of the armature shaft 26 is formed in a lower surface of the upper core 32 that faces the armature 28. An upper coil 42 is received in the annular groove 40. The upper coil 42 and the upper core 32 form an electromagnet 61 for driving the exhaust valve 10 in the valve closing direction.

An annular groove 44 having a center located on the axis of the armature shaft 26 is formed in a upper surface of the lower core 34 that faces the armature 28. A lower coil 46 is received in the annular groove 44. The lower coil 46 and the lower core 34 form an electromagnet 62 for driving the exhaust valve 10 in the valve opening direction.

In operation, electric current is applied to the coils 42, 46 of the electromagnets 61, 62 under control of an electronic control unit 50 that governs various controls of the internal combustion engine. The electronic control unit 50 includes a CPU, a memory, and a drive circuit for supplying exciting current to the coils 42, 46 of the electromagnets 61, 62. The electronic control unit 50 further includes an input circuit (not shown) for receiving a detection signal from the displacement sensor 52, an A/D converter (not shown) that converts the detection signal as an analog signal into a digital signal, and so on.

FIG. 1 shows a state of the exhaust valve 10 in which neither the upper coil 42 nor the lower coil 46 is supplied with exciting current, and therefore no electromagnetic force is generated by the electromagnets 61, 62. In this state, the armature 28 is not attracted by electromagnetic force of either of the electromagnets 61, 62, but rests at an intermediate position between the cores 32, 34 at which the elastic forces of the springs 24, 38 are balanced with each other. With the exhaust valve 10 held in the state of FIG. 1, the valve body 16 is spaced apart from the valve seat 15 so that the exhaust port 14 is in a half-open state. Hereinafter, the position of the exhaust valve 10 in the state of FIG. 1 will be referred to as "neutral position".

Next, the operation of the exhaust valve 10 that is driven through control of current applied to the coils 42, 46 will be described.

Before driving of the exhaust valve 10 in the opening and closing directions is started, a process (which will be called "initial driving process") is implemented to displace or move the exhaust valve 10 from the neutral position to a fully closed position corresponding to an end of the stroke of the valve shaft 20, and hold the exhaust valve 10 still in this position. In the initial driving process, exciting current is applied from the drive circuit of the electronic control unit 50 alternately to the coils 42, 46 at predetermined time intervals. With the current applied to the coils 42, 46 thus controlled, the armature 28, the armature shaft 26, the valve shaft 20, etc. are forcibly oscillated under the influences of the elastic forces of the springs 24, 38 and the electromagnetic forces generated alternately by the electromagnets 61, 62. Then, the amplitude of the oscillation of the armature 28 gradually increases until the armature 28 is brought into abutment with the upper core 32. At the moment when the armature 28 abuts on the upper core 32, the current application to the lower coil 46 is stopped, and the upper coil 42 is continuously supplied with a constant exciting current. As a result, the armature 28 is attracted to the upper core 32 by the electromagnetic force generated by the electromagnet 61, and is maintained in this state in which the armature 28 rests upon the upper core 32. Thus, the exhaust valve 10 is held in the fully closed position, which is the initial operating state that permits subsequent opening and closing actions of the valve 10.

In order to open and close the exhaust valve 10 initially placed in the fully closed position, in synchronism with the operation of the engine, an exciting current, which is set as a sum of a feed-forward current component (hereinafter referred to as "FF current If") and a feedback current component (hereinafter referred to as "FB current Ib"), is supplied from the drive circuit of the electronic control unit 50 selectively to the coils 42, 46 of the electromagnets 61, 62.

The driving force for opening and closing the exhaust valve 10 is basically determined by the elastic forces of the springs 24, 38, the masses of the valve body 16, the valve shaft 20, the armature 28, the armature shaft 26, etc. The driving force also varies depending on the magnitudes of frictional resistance at various sliding portions including, for example, interfaces between the armature shaft 26 and the cores 32, 34, an interface between the valve shaft 20 and the cylinder head 18, etc. Furthermore, since the valve body 16 receives external force based on exhaust pressures in the combustion chamber 12 and the exhaust port 14 (or intake pressures in the case of an intake valve), the driving force on the exhaust valve 10 changes under the influence of the external force.

In order to ensure a sufficiently high operating stability of the exhaust valve 10, it is necessary to set the magnitudes of the electromagnetic force generated by the electromagnets 61, 62, in other words, the amounts of exciting current supplied to the coils 42, 46, to appropriate values so that the resulting driving force reflects the frictional resistance at various sliding portions, and the external force due to the in-cylinder pressure and other factors.

While the magnitude of frictional resistance at each sliding portion is regarded as being substantially constant regardless of the engine load, the magnitude of external force due to the in-cylinder pressure and other factors is likely to change greatly in accordance with the engine load. For example, when the engine load is increased, the combustion pressure is increased, and the in-cylinder pressure or the exhaust pressure at the time of opening of the exhaust valve 10 is accordingly increased, resulting in an increase in the external force due to the aforementioned pressures. Therefore, if the exciting current applied to the coils 42, 46 is determined without taking the external force into consideration, the electromagnetic force for driving the exhaust valve 10 may become insufficient, resulting in a reduction in the operating stability of the exhaust valve 10, or the exhaust valve 10 may be driven by excessively large electromagnetic force, which may result in an increase in the power consumption, and/or cause vibrations and noises (due to contacts between the armature 28 and the cores 32, 34, and collision between the valve seat 15 and the valve body 16, etc.) upon opening and closing of the exhaust valve 10.

According to the embodiment of the invention, therefore, the FF current "If" and the FB current "Ib" are appropriately set so as to reflect the frictional resistance and the external force due to the in-cylinder pressure and other factors, so that the exhaust valve 10 operates with a sufficiently high stability, and does not suffer from the above-described problems, such as increased power consumption and the noises and vibrations occurring upon opening and closing thereof.

A procedure of setting the FF current "If" and the FB current "Ib" will be hereinafter described in detail. A target drive velocity Vt of the exhaust valve 10 that is referred to upon setting of the FF current "If" and the FB current "Ib" will be initially described.

If the supply of exciting current to the upper coil 42 is stopped while the exhaust valve 10 is held at the fully closed position through the initial driving process, the armature 28 is moved away from the upper core 32, and the armature 28, the armature shaft 26, the retainers 22, 30, the valve shaft 20 and the valve body 16 (which will be generally called "a movable portion") are oscillated by the elastic forces of the springs 24, 38.

Assuming that the operation of the engine is stopped and no external force based on the in-cylinder pressure acts on the valve body 16, and that no frictional resistance is present at each sliding portion, the movable portion as indicated above is caused to freely oscillate under the elastic forces of the springs 24, 38.

In this embodiment, the velocity of the movable portion of the exhaust valve 10 when it is freely oscillated as described above is determined as a target drive velocity "Vt" used when driving the exhaust valve 10, and the target drive velocity "Vt" is set in accordance with the displacement of the exhaust valve 10 (hereinafter, referred to as "valve displacement") "X". By setting the target drive velocity "Vt" in this manner, the elastic energies stored in the springs 24, 38 can be converted into kinetic energy of the movable portion, and the energy loss in driving the exhaust valve 10 can be minimized.

Figure 3:
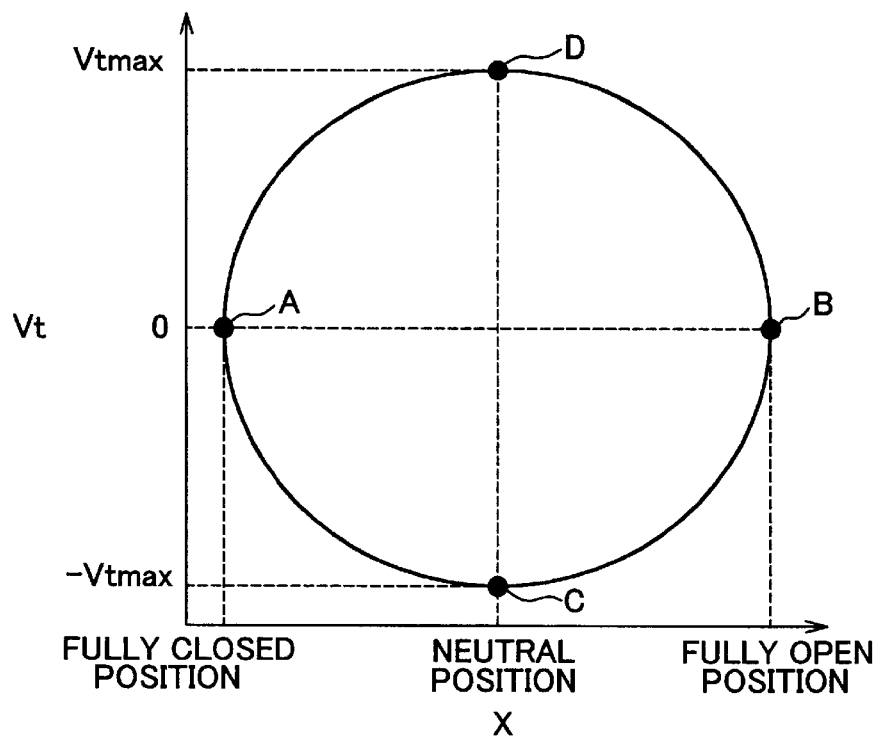
FIG. 3 is a map used in arithmetic operations, which indicates a relationship between the target drive velocity and the valve displacement.

FIG. 3 shows a map indicating a relationship between the target drive velocity "Vt" and the valve displacement "X". The relationship indicated in this map is stored in advance as function data in a memory of the electronic control unit 50.

As shown in the map, in the case where the exhaust valve 10 displaces from the fully closed position to a fully open position (i.e., when the position of the exhaust valve 10 changes from point A to point C and then to point B along a solid line in FIG. 3), the magnitude of the target drive velocity "Vt" (=|Vt|) takes a minimum value "0" when the exhaust valve 10 is at the fully closed position (point A) or the fully open position (point B). When the exhaust valve 10 is at the neutral position (point C), the magnitude of the target drive velocity "Vt" takes a maximum value (|−Vtmax|). During displacement of the exhaust valve 10 from the fully open position to the fully closed position (i.e., a change in the position from point B to point D, and further to point A, along the solid line in FIG. 3), the magnitude of the target drive velocity Vt takes the minimum value "0" when the exhaust valve 10 is at the fully open position (point B) or the fully closed position (point A). When the exhaust valve 10 is at the neutral position (point D), the magnitude of the target drive velocity "Vt" takes a maximum value (|Vtmax|).

Figure 2:
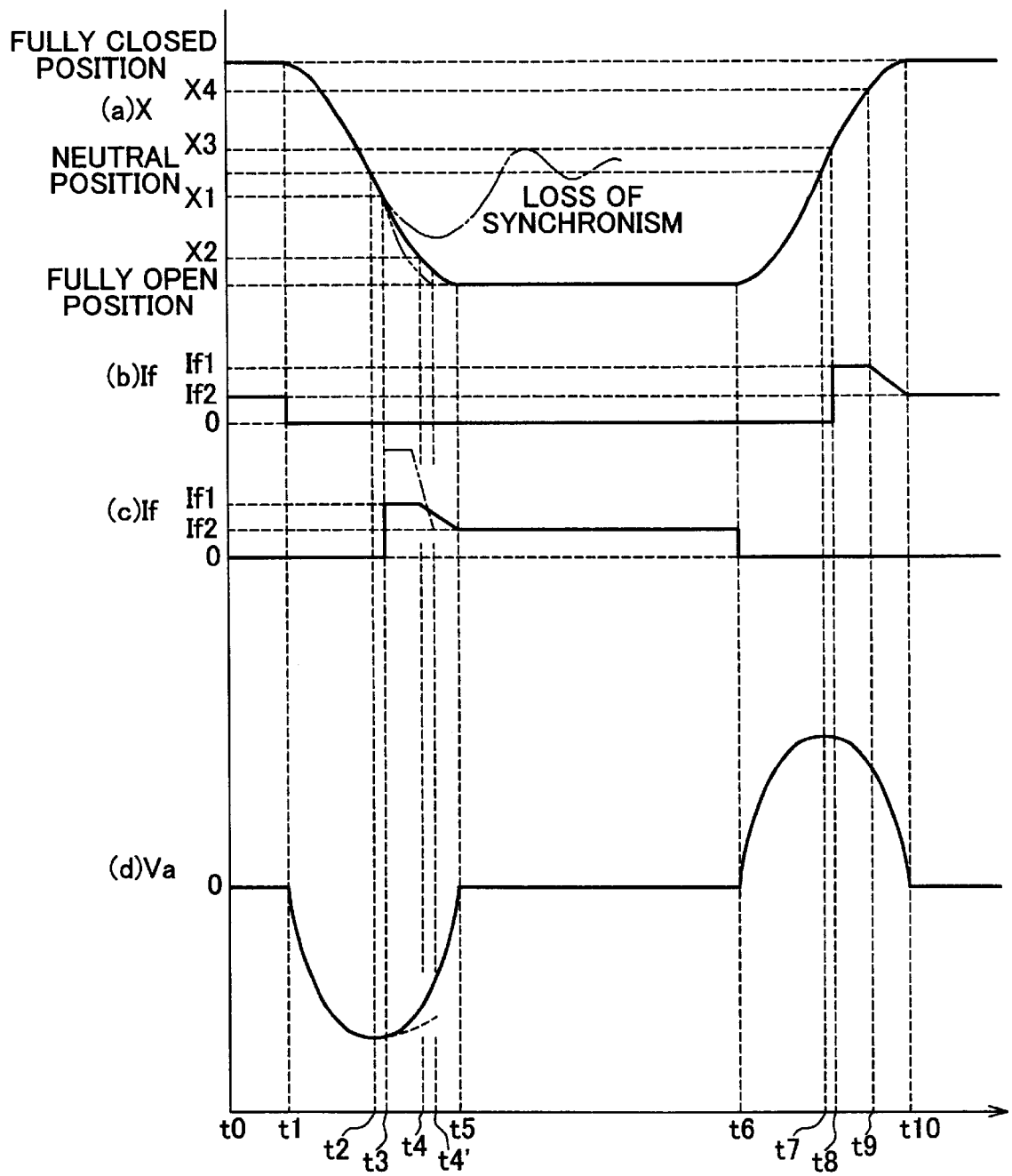
FIG. 2 is a timing chart illustrating time-dependent changes in the valve displacement and other parameters during a no-engine-load state.

A procedure of setting the FF current "If" will be described with reference to FIGS. 2, 4 and 5. FIG. 2 is a timing chart indicating time-dependent changes in the valve displacement "X" ((a) in FIG. 2), the FF currents "If" supplied to the coils 42, 46 of the electromagnets 61, 62 ((b), (c) in FIG. 2), and the actual drive velocity Va of the exhaust valve 10 when there is no engine load. In FIG. 2, section (b) indicates time-dependent changes in the FF current "If" supplied to the upper coil 42, and section (c) indicates time-dependent changes in the FF current "If" supplied to the lower coil 46.

The FF current "If" supplied to the upper coil 42 during a period between time t0 and time t1 in FIG. 2 is set to a value (hold current value) "If2" such that the armature 28 is held in contact with the upper core 32. Thus, the exhaust valve 10 is held at the fully closed position during this period.

To open the exhaust valve 10 from the aforementioned state, the supply of the FF current "If" to the upper coil 42 is stopped at point of time t1. As a result, the movable portion of the exhaust valve 10 starts moving in the valve opening direction under the elastic force of the upper spring 38. Subsequently, the magnitude (absolute value) of the actual drive velocity "Va" gradually increases, and reaches the maximum at a point of time t2 when the exhaust valve 10 reaches the neutral position. When the exhaust valve 10 further moves beyond the neutral position, the FF current "If" starts being supplied to the lower coil 46.

Figure 4:
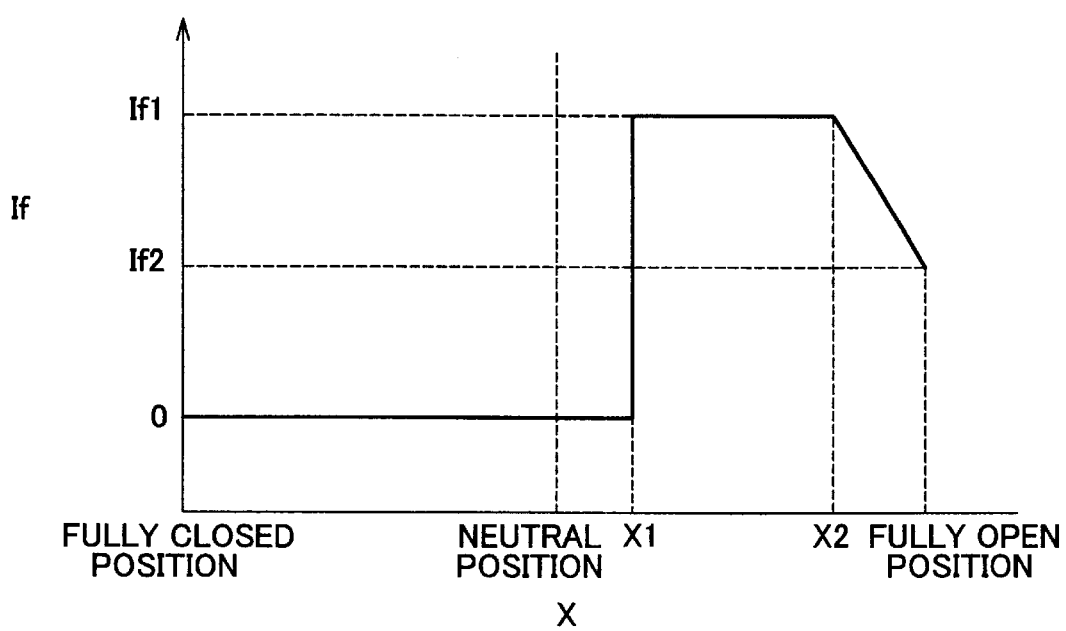
FIG. 4 is a map used in arithmetic operations, indicating a relationship between the valve displacement and the level of feed-forward current supplied to a lower coil.

FIG. 4 shows a map indicating a relationship between the FF current "If" supplied to the lower coil 46 and the valve displacement "X". The relationship between the FF current "If" and the valve displacement "X" indicated in this map is stored in advance as function data in the memory of the electronic control unit 50.

As indicated in the map, the FF current "If" is set to a constant value "If1" during a period of time in which the exhaust valve 10 moves from position "X1" to position "X2" that is closer to the fully open position than position "X1" (i.e., a period between time t3 and time t4 in FIG. 2). The position "X1" is shifted a certain distance from the neutral position toward the fully open position, as shown in FIG. 4. As the FF current "If" is supplied to the lower coil 46, the armature 28 is attracted toward the lower core 34 by the electromagnetic force of the electromagnet 62.

Then, during a period in which the exhaust valve 10 moves from the position "X2" to the fully open position (period between time t4 and time t5), the FF current "If" is gradually reduced as the exhaust valve 10 approaches the fully open position. Therefore, the electromagnetic force generated by the electromagnet 62 gradually decreases. The bias force of the lower spring 24 for biasing or urging the movable portion of the exhaust valve 10 in the valve closing direction is increased as the exhaust valve 10 approaches the fully open position. Thus, the bias force of the lower spring 24 increases while the electromagnetic force of the electromagnet 62 decreases, and consequently the magnitude of the actual drive velocity "Va" gradually decreases.

When the exhaust valve 10 reaches the fully open position, the FF current "If" is set to a value (hold current value) If2 such that the armature 28 is held in contact with or rests upon the lower core 34. As a result, the exhaust valve 10 is held at the fully open position.

To close the exhaust valve 10 from the above state, the supply of the FF current "If" to the lower coil 46 is stopped at a point of time t6. As a result, the movable portion of the exhaust valve 10 starts moving in the valve closing direction due to the elastic force of the lower spring 24. Subsequently, the magnitude of the actual drive velocity "Va" gradually increases, and reaches the maximum at a point of time t7 at which the exhaust valve 10 reaches the neutral position. As the exhaust valve 10 is further moved beyond the neutral position, the FF current "If" starts being supplied to the upper coil 42.

Figure 5:
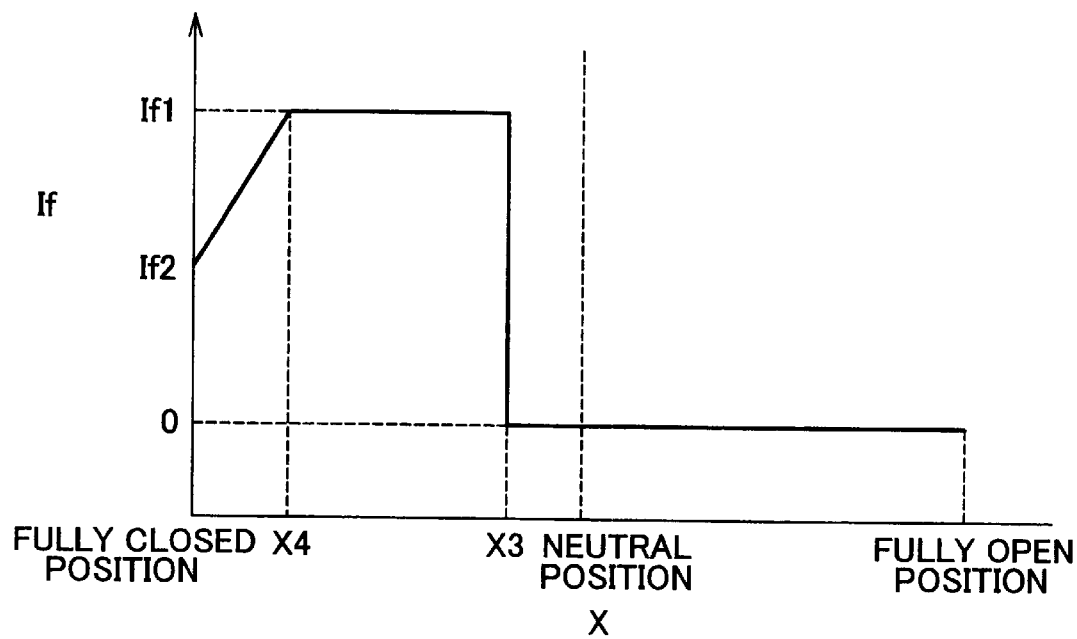
FIG. 5 is a map used in arithmetic operations, indicating a relationship between the valve displacement and the level of feed-forward current supplied to an upper coil.

FIG. 5 shows a map indicating a relationship between the FF current "If" supplied to the upper coil 42 and the valve displacement "X". The relationship between the FF current "If" and the valve displacement "X" indicated in this map is stored in advance as function data in the memory of the electronic control unit 50.

As indicated in the map, during a period in which the exhaust valve 10 moves from position "X3" to position "X4" that is closer to the fully closed position that position "X3" (i.e., a period between time t8 and time t9 in FIG. 2), the FF current "If" is set to a constant value If1. The position "X3" is shifted a certain distance from the neutral position toward the fully closed position, as shown in FIG. 5. As the FF current "If" is supplied to the upper coil 42, the armature 28 is attracted toward the upper core 32 under the electromagnetic force of the electromagnet 61.

Then, during a period in which the exhaust valve 10 moves from the position "X4" to the fully closed position (i.e., a period between time t9 and time t10), the FF current "If" is gradually reduced as the exhaust valve 10 approaches the fully closed position. Therefore, the electromagnetic force generated by the electromagnet 61 gradually decreases. The bias force of the upper spring 38 for biasing or urging the movable portion of the exhaust valve 10 in the valve opening direction is increased as the exhaust valve 10 approaches the fully closed position. Thus, since the bias force of the upper spring 38 increases while the electromagnetic force of the electromagnet 61 decreases, the magnitude of the actual drive velocity "Va" gradually decreases.

When the exhaust valve 10 reaches the fully closed position, the FF current "If" is set to the hold current value "If2" and is kept at this value. As a result, the exhaust valve 10 is held at the fully closed position.

It should be noted herein that the FF current "If" supplied to the coils 42, 46 is set to a minimum magnitude that is needed in order to make the actual drive velocity "Va" equal to the target drive velocity "Vt" when there is no engine load, while taking account of frictional resistance at various sliding portions in the exhaust valve 10.

For example, if the FF current "If" supplied to the lower coil 46 is not sufficient when the exhaust valve 10 is to be opened, the electromagnet 62 does not generate electromagnetic force large enough to stably drive the exhaust valve 10, and the armature 28 cannot be brought into abutment or contact with the lower core 34. This results in a generally-termed loss of synchronism with which the exhaust valve 10 does not reach the fully open position but settles toward the neutral position as indicated by a one-dot chain line in (a) in FIG. 2. If such loss of synchronism occurs, it becomes necessary to perform the initial driving process again, and the exhaust valve 10 can no longer operate with a sufficiently high stability.

If the FF current "If" supplied to the lower coil 46 is set to be excessively large, on the other hand, the magnitude of the actual drive velocity "Va" (measured at time t4') immediately before the exhaust valve 10 reaches the fully closed position becomes relatively large, as indicated by two-dot chain lines in (a), (c) and (d) in FIG. 2. As a result, an increased quantity of energy is lost at the time of abutment of the armature 28 with the lower core 34, resulting in increased power consumption and increased noise and vibrations caused by the abutment. Furthermore, the armature 28 may collide with the lower core 34 and rebound, and loss of synchronism may result if the armature 28 rebounds to a large extent.

In this embodiment, the FF current "If" supplied to the coils 42, 46 is controlled to a minimum level that is needed to make the actual drive velocity "Va" equal to the target drive velocity "Vt" when there is no engine load. Accordingly, the exhaust valve 10 operates with a sufficiently high stability, and is substantially free from otherwise possible problems, such as an increase in the power consumption, and noise and vibrations that would occur upon opening or closing of the valve 10.

Next, a procedure of setting the FB current "Ib" will be described with reference to FIGS. 6 to 8.

When there is no engine load, the actual drive velocity "Va" can be made equal to the target drive velocity "Vt" by supplying the FF current "If" set as described above to the coils 42, 46 for opening and closing the exhaust valve 10. In contrast, during an actual operation of the engine, namely, when a load is applied to the engine, external forces based on the in-cylinder pressure and the exhaust pressure act on the valve body 16 of the exhaust valve 10. Due to the influence of such external forces, the actual drive velocity "Va" tends to deviate from the target drive velocity "Vt".

Figure 6:
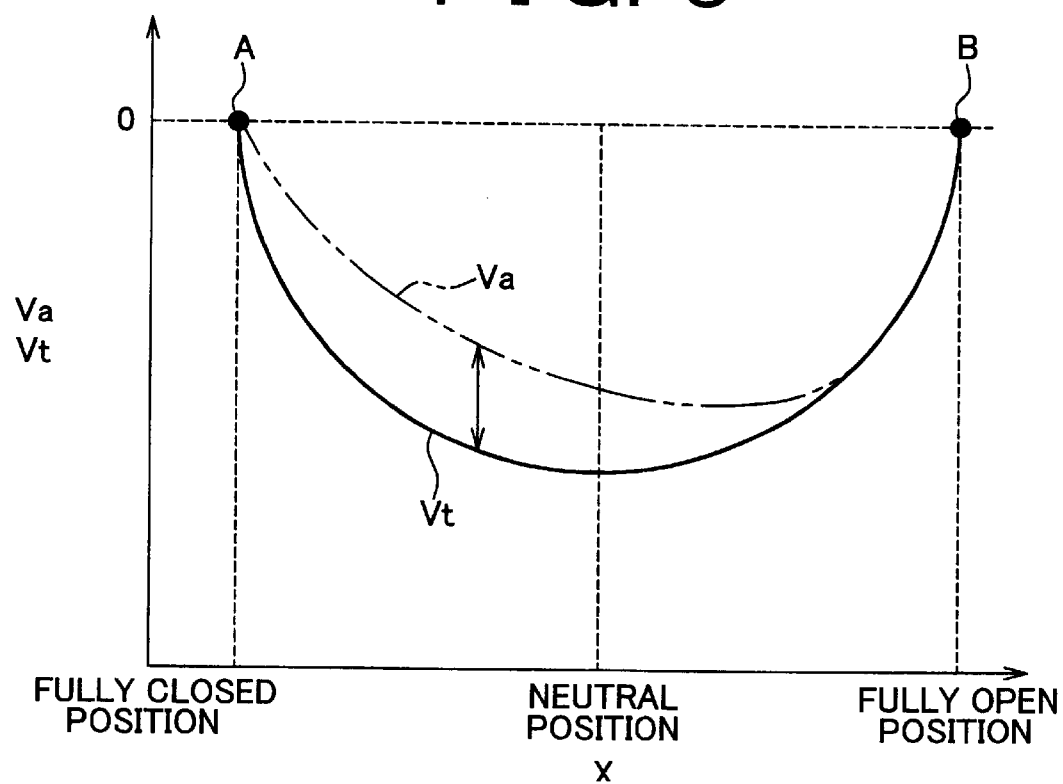
FIG. 6 is a graph showing changes of the actual drive velocity and the target drive velocity with the valve displacement.

FIG. 6 indicates the actual drive velocity "Va" and the target drive velocity "Vt" having a tendency as mentioned above, in relation to the valve displacement "X". As the exhaust valve 10 is opened, the target drive velocity "Vt" changes from point A to point B along a solid line in FIG. 6 whereas the actual drive velocity "Va" cannot follow the changes of the target drive velocity "Vt", and becomes smaller in magnitude than the target drive velocity "Vt" (|Va|≦|Vt|) as indicated by a two-dot chain line in FIG. 6 under the influence of the aforementioned external force. In this embodiment, a velocity deviation "ΔV" between the actual drive velocity "Va" and the target drive velocity "Vt" is detected as a degree by which the actual drive velocity "Va" deviates or separates from the target drive velocity "Vt". Then, the FB current "Ib" is set based on the detected velocity deviation "ΔV".

A procedure or process of controlling driving (i.e., opening and closing) of the engine valve based on the FB current "Ib" and the FF current "If" will be described with reference to the flowchart shown in FIG. 7. The process or series of steps as illustrated in the flowchart is performed after the supply of the hold current "If2" to the coil 42 or 46 is stopped to drive (i.e., open or close) the exhaust valve 10. The process is repeatedly executed by the electronic control unit 50 at predetermined time intervals "Δt".

Figure 7:
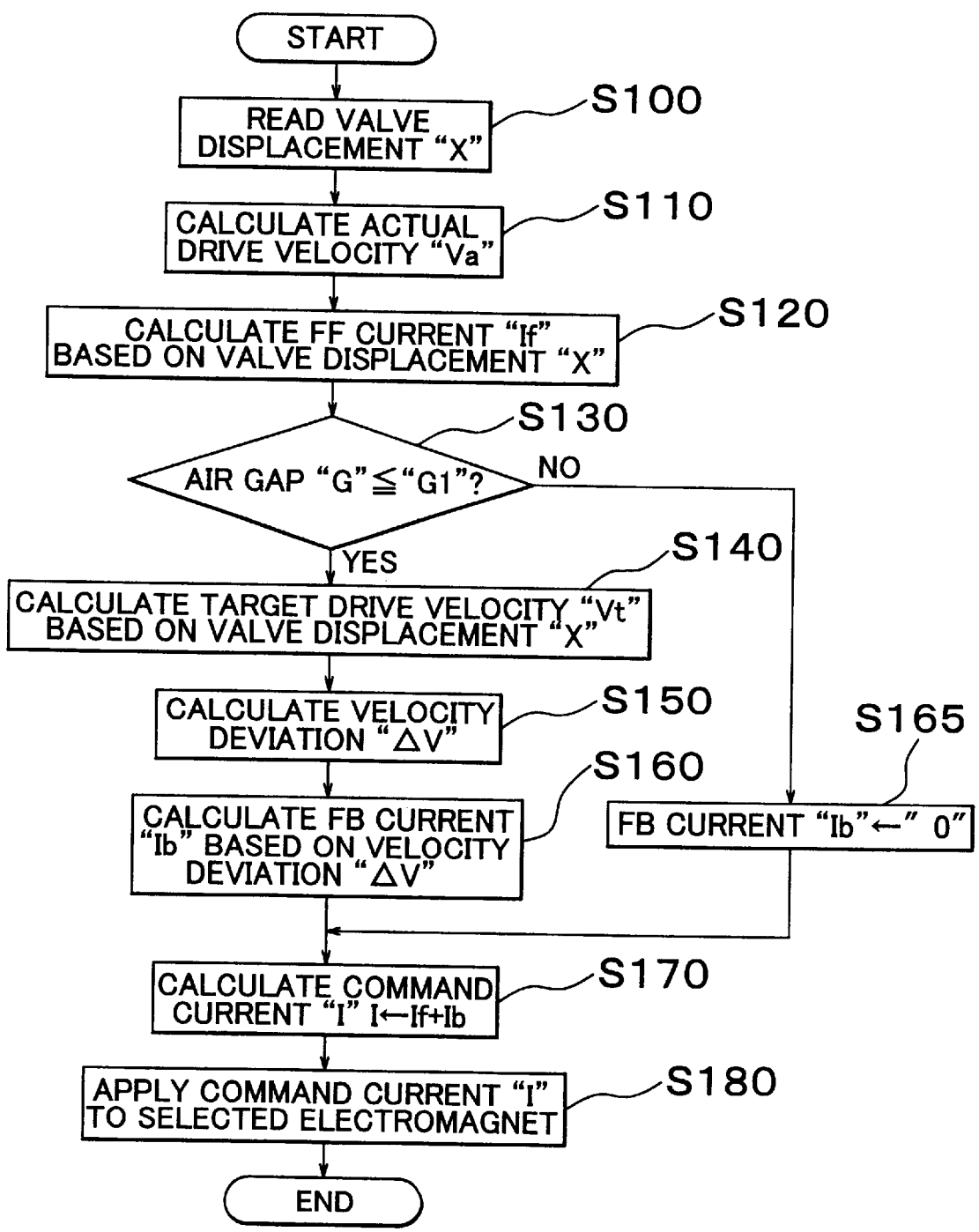
FIG. 7 is a flowchart illustrating a procedure of valve drive control according to a first embodiment of the invention.

In the process of FIG. 7, step 100 is initially executed to read the valve displacement "X" based on the detection signal from the displacement sensor 52. Then, step 110 is executed to calculate an actual drive velocity "Va" of the exhaust valve 10 according to expression (1) as indicated below. In this embodiment, an actual drive velocity detecting unit that detects the actual drive velocity "Va" of the exhaust valve 10 is constituted by a portion of the electronic control unit 50 that executes step S110 and the displacement sensor 52.

$$Va = (X_{(i)} - X_{(i-1)})/\Delta t \quad (1)$$

In the above expression (1), subscript "(i)" indicates a value (of the displacement "X") detected in the present control cycle, and "(i−1)" indicates a value (of the displacement "X") detected in the previous control cycle, while "(i+1)" indicates an estimated value to be obtained in the next control cycle.

After the actual drive velocity "Va" is calculated as described above, step 120 is executed to calculate an FF current "If" based on the valve displacement "X", with reference to the map as indicated in FIG. 4 or 5.

Step 130 is then executed to determine whether an air gap "G" between the armature 28 and the electromagnet 61 or 62 is equal to or less than a predetermined value "G1" (step 130).

The air gap "G" is defined as a distance between the armature 28 and one of the upper core 32 and the lower core 34 toward which the armature 28 is moving. More specifically, the air gap "G" corresponds to a distance between the armature 28 and the lower core 34 when the exhaust valve 10 is about to be fully opened. When the exhaust valve 10 is about to be closed., on the other hand, the air gap "G" corresponds to a distance between the armature 28 and the upper core 32.

In step 130, it is determined whether to start feedback control based on the FB current "Ib" depending upon the size of the air gap "G". Here, the size of the air gap "G" is used as a basis for determining whether to start the feedback control for the following reason.

Assuming that substantially the same level of exciting current is supplied to the electromagnet 61 or 62, the electromagnetic force acting on the armature 28 is reduced with an increase in the air gap "G". In other words, as the air gap "G" increases, an increased proportion of the electric energy supplied to the electromagnet 61 or 62 is likely to be wastefully consumed without contributing to attraction (or driving) of the armature 28 toward the corresponding core. In the above-described process, therefore, the feedback control based on the velocity deviation "ΔV" is performed only after it is determined that the air gap "G" is equal to or less than the predetermined value "G1". If the air gap "G" is greater than the predetermined value "G1", which means that the armature 28 is driven by the electromagnet 61 or 62 to be attracted to the corresponding core 32 or 34 with a reduced electric efficiency, the feedback control is substantially stopped by setting the FB current "Ib" to "0", so as to minimize the increase in the power consumption.

If it is determined in step 130 that the air gap "G" is equal to or less than the predetermined value "G1" ("YES" in step 130), step 140 is executed to calculate a target drive velocity "Vt" with reference to the map as indicated in FIG. 3. Step 150 is then executed to calculate the velocity deviation "ΔV" according to the following expression (2):

$$\Delta Va = |Vt| - |Va| \tag{2}$$

In the above expression (2), "|Vt|" and "|Va|" represent the magnitudes (absolute values) of the target drive velocity "Vt" and the actual drive velocity "Va", respectively.

In step 160, the FB current "Ib" is calculated according to the following expression (3), based on the velocity deviation ΔV obtained in step 150.

$$Ib = K \cdot \Delta V \tag{3}$$

In the above expression (3), "K" is a feedback gain, and is set to a constant value in this embodiment.

It is to be noted that if the magnitude of the external force acting on the valve body 16 of the exhaust valve 10 increases in accordance with the engine load, the velocity deviation "ΔV" increases with an increase in the degree of deviation of the actual drive velocity "Va" from the target drive velocity "Vt". Therefore, the FB current "Ib", which is equal to the product of the velocity deviation "ΔV" and the feedback gain "K", is set to a level that can compensate for the influence of the engine load.

Conversely, if it is determined in step 130 that the air gap "G" is greater than the predetermined value "G1" ("NO" in step 130), step 165 is executed to set the FB current "Ib" to "0".

After the FB current "Ib" is thus determined in step 160 or step 165, a final command current "I", which is to be applied to the electromagnet 61 or 62, is calculated according to the following expression (4) in step 170.

$$I = Ib + If \tag{4}$$

If the magnitude |Va| of the actual drive velocity "Va" is greater than the magnitude |Vt| of the target drive velocity "Vt", and the calculated FB current "Ib" becomes a negative value whereby the command current "I" calculated according to the above expression (4) would be a negative value, the command current "I" is set to "0".

In step 180, the command current "I" thus determined is applied to a selected one of the electromagnets 61, 62. More specifically, the command current "I" is supplied to the lower coil 46 so as to open the exhaust valve 10, while the command current "I" is supplied to the upper coil 42 so as to close the exhaust valve 10. In this manner, the magnitude of the electromagnetic force generated by each electromagnet 61, 62 is controlled through control of electric current applied to the corresponding electromagnet 61, 62. The process of FIG. 7 is then terminated after execution of step 180.

Figure 8:
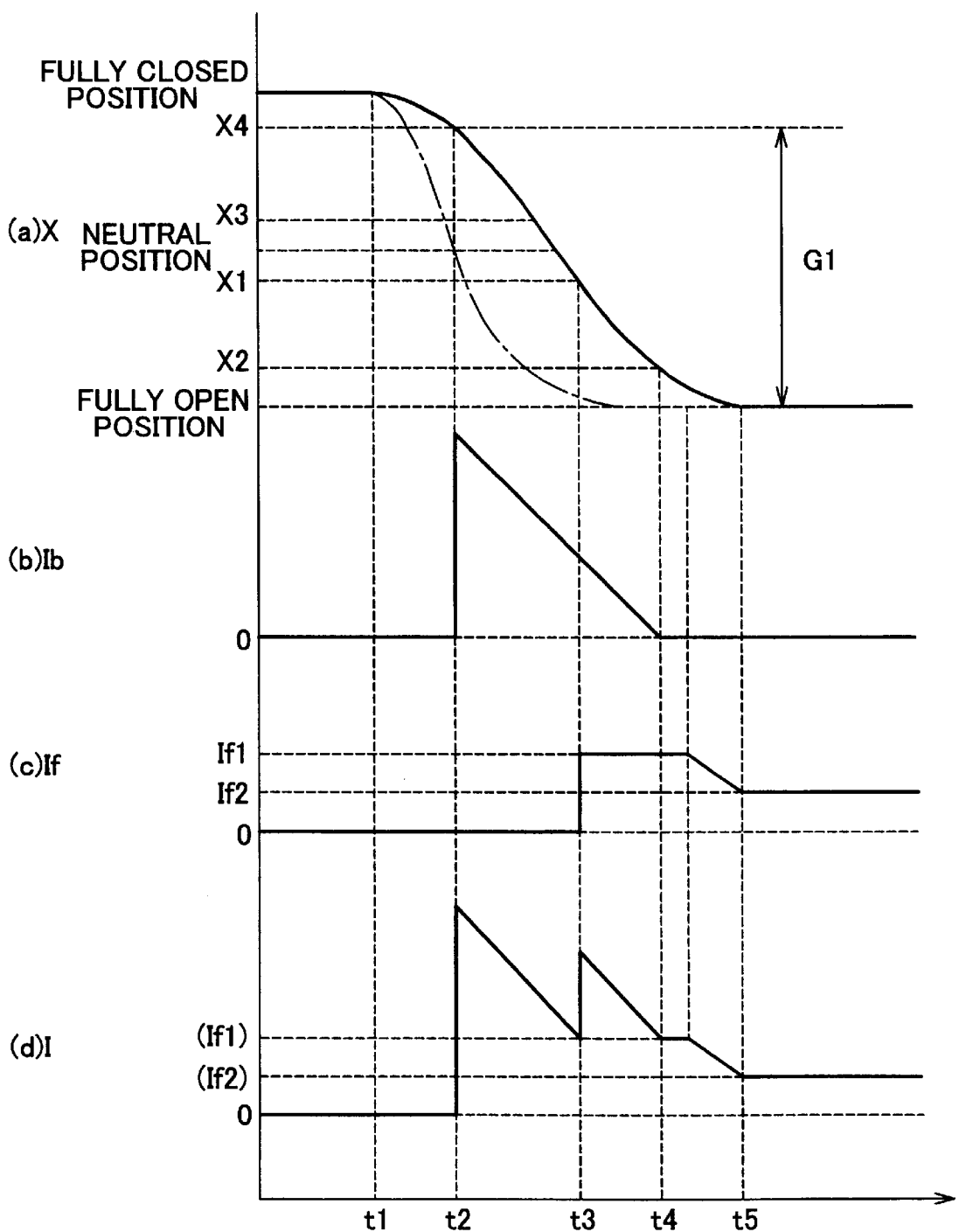
FIG. 8 is a timing chart indicating time-dependent changes of the valve displacement, the feedback current, the feed-forward current, and the command current.

FIG. 8 indicates time-dependent changes in the valve displacement "X" ((a) in FIG. 8), the FB current "Ib" ((b) in FIG. 8), the FF current "If" ((c) in FIG. 8), and the sum (command current "I") of the FB current "Ib" and the FF current "If" ((d) in FIG. 8) in the case where the exhaust valve 10 is driven to the fully open position in accordance with the process of FIG. 7. Each of the FB current "Ib", FF current "If" and the command current "I" is applied to the lower coil 46 so that the exhaust valve 10 is opened. In the section (a) of FIG. 8, a solid line indicates the actual valve displacement "X", and a one-dot chain line indicates the valve displacement "X" in the case where the exhaust valve 10 is moved such that the actual drive velocity "Va" is kept equal to the target drive velocity "Vt".

As indicated in FIG. 8, during a period between a point of time (t1) when the supply of the FF current "If" to the upper coil 42 (which is not shown in FIG. 8) is stopped and the exhaust valve 10 starts being driven in the opening direction, and a point of time (t2) when the air gap "G" reaches the predetermined value "G1", all of the FF current "If", the FB current "Ib" and the command current "I" applied to the lower coil 46 are equal to "0", and therefore the movable portion of the exhaust valve 10 is moved toward the fully open position under the bias force of the upper spring 38.

Subsequently, when the air gap "G" decreases to be equal to the predetermined value "G1" at time t2, the FB current "Ib" is calculated from that point on as a value corresponding to the velocity deviation "ΔV". Therefore, the command current I is calculated as a value equal to the FB current "Ib", and thus the feedback control alone is executed in the period between t2 and t3.

When the valve displacement X then reaches the predetermined value "X1" at a point of time t3, the FF current "If" starts being calculated as a value corresponding to the valve displacement "X". Accordingly, the command current "I" is calculated as the sum of the FF current "If" and the FB current "Ib", so that the feed-forward control and the feedback control are both executed in the period between t3 and t4.

Subsequently, when the actual drive velocity "Va" of the exhaust valve 10 settles to be equal to the target drive velocity "Vt", the velocity deviation "ΔV" naturally becomes "0", and the FB current "Ib" also becomes equal to "0". Thus, as long as this condition (Va=Vt) is satisfied, the command current "I" is set equal to the FF current "If", so that only the feed-forward control is substantially executed (in the period between t4 and t5). Subsequently, when the valve displacement "X" reaches the fully open position at a point of time t5, the FF current "If" is set equal to the hold current value "If2" from that point on, so that the exhaust valve 10 is held at the fully open position.

This embodiment, in which the driving of the engine valve (an intake valve or an exhaust valve) is controlled in the above-described manner, yields the following advantages.

(1) Even when the external force that acts on the engine valve changes in accordance with the engine load, the engine valve is driven with a suitable electromagnetic force corresponding to the engine load, so that the engine valve exhibits substantially the same opening and closing characteristics as when no load is applied to the engine.

Furthermore, since the influence of the engine load is compensated for or cancelled through the feedback control, the FF current in the feed-forward control can be set as a value that enables the actual drive velocity to coincide with the target drive velocity set for a no-load state, without regard to the actual engine load. Accordingly, there is no need to consider the influence of the engine load when setting the FF current, thus eliminating the correlating or matching operation to determine a relationship between the engine load and the electromagnetic force suitable for the engine load through experiments, or the like. Hence, the operation to correlate control constants can be considerably simplified.

(2) Furthermore, the target drive velocity of the engine valve is set so that the magnitude of the drive velocity decreases to a minimum immediately before the valve reaches one end of its stroke, that is, the fully closed position or the fully open position. With this arrangement, it is possible to reduce noise and vibrations at the time of opening or closing of the engine valve, and achieve a reduction in the consumption of electric power required for driving the engine valve.

(3) Still further, the target drive velocity is set to be equal to the velocity of displacement of the engine valve when it is freely oscillated between the opposite ends of the stroke of the valve shaft under elastic forces of the upper and lower springs. Thus, the engine valve can be driven in a manner that minimizes the energy loss, and therefore the power consumption can be reduced.

(4) When it is determined that the air gap "G" is greater than the predetermined value "G1" and the armature 28 is attracted to the upper or lower core by the corresponding electromagnet 61, 62 with a relatively low electric efficiency, the feedback control is substantially stopped by setting the FB current to "0", thereby suppressing an otherwise possible increase in the power consumption.

Second Embodiment

A second embodiment of the invention will be described mainly with regard to differences of this embodiment from the first embodiment.

In the first embodiment, the feedback gain "K" used in the calculation of the FB current "Ib" based on the velocity deviation "ΔV" is set to a constant value. In the second embodiment, the feedback gain "K" can be varied depending upon the size of the air gap "G" and the magnitude of the velocity deviation "ΔV".

Figure 9:
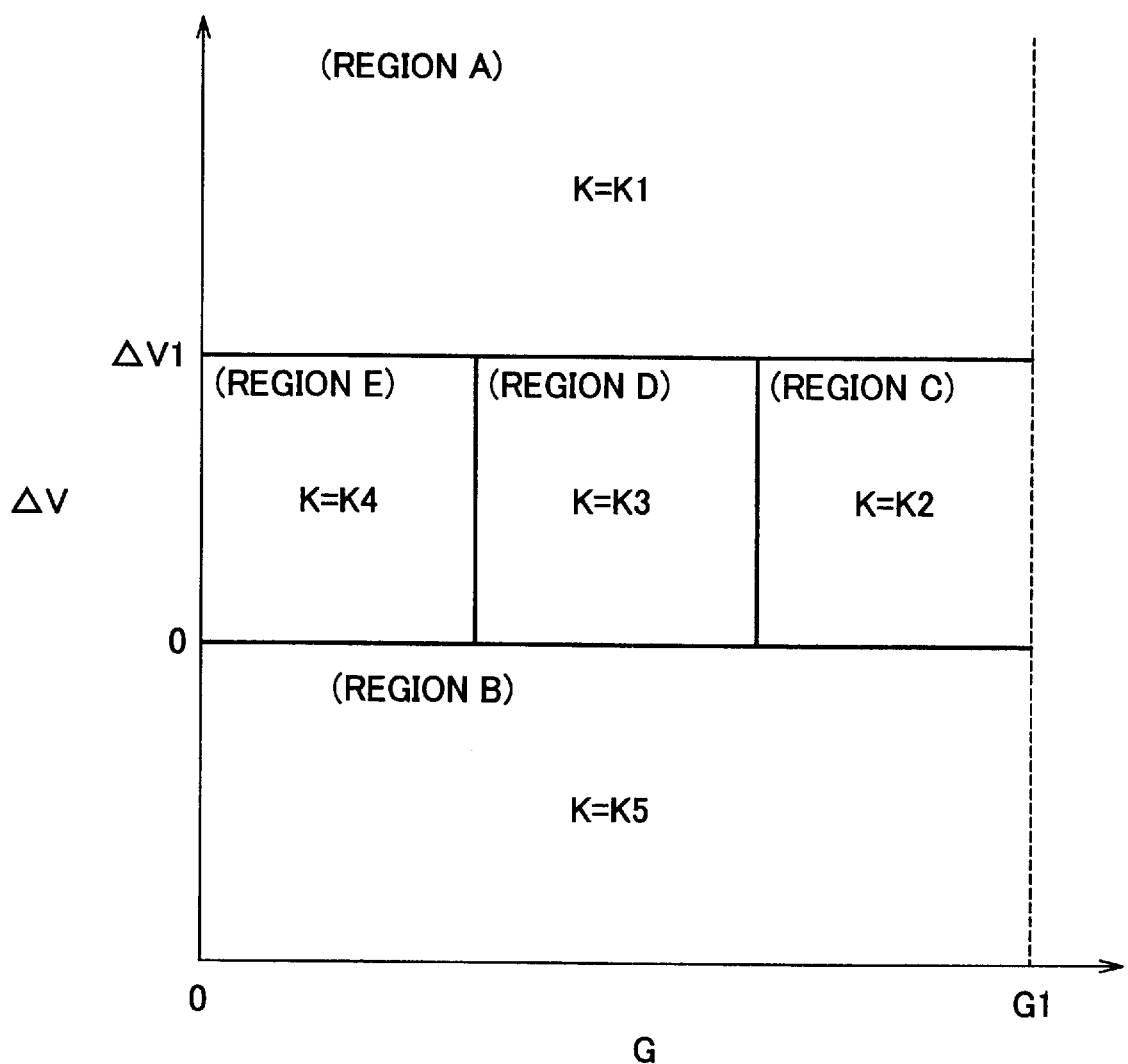
FIG. 9 is a map that is referred to when a feedback gain is determined.

A procedure of setting the feedback gain "K" in this manner will be described with reference to FIG. 9. FIG. 9 shows a map indicating a relationship among the air gap "G", the velocity deviation "ΔV" and the feedback gain "K". The relationship indicated in the map is stored in advance as function data in the memory of the electronic control unit 50.

As indicated in the map, the feedback gain "K" is set to one of predetermined values K1, K2, K3, K4 and K5 corresponding to respective regions A, B, C, D and E that are determined in accordance with the air gap "G" and the velocity deviation "ΔV". With regard to the predetermined values K1 to K5, the relationship as indicated in the following expression (5) is established in advance.

$$K1 > K2 > K3 > K4 > K5 \quad (5)$$

(1) Region A

If the velocity deviation "ΔV" is equal to or greater than a predetermined value "ΔV1" (>0), the feedback gain "K" is set to the predetermined value "K1" without regard to the size of the air gap "G". In the region A, the magnitude |Va| of the actual drive velocity "Va" is considerably less than the magnitude |Vt| of the target drive velocity "Vt", and the exhaust valve 10 may suffer from loss of synchronism.

In the region A, the electromagnetic force of each electromagnet 61, 62 is increased by setting the feedback gain "K" to the maximum value, so that the actual drive velocity "Va" will be quickly settled to be equal to the target drive velocity "Vt".

(2) Region B

If the velocity deviation "ΔV" is less than "0", the feedback gain "K" is set to the predetermined value "K5" regardless of the size of the air gap "G". In the region B, the magnitude |Va| of the actual drive velocity "Va" is greater than the magnitude |Vt| of the target drive velocity "Vt", and there is a possibility that the velocity of the movable portion becomes high at the moment when the exhaust valve 10 reaches the fully open position or the fully closed position. Furthermore, in the region B, the FB current "Ib" is calculated as a negative value. If the feedback gain K is large, therefore, the FF current "If" is substantially reduced due to this negative FB current "Ib", whereby the command current "I" becomes excessively small, which may result in a loss of synchronism of the exhaust valve 10.

In the region B, the feedback gain "K" is set to the smallest value among all the regions A–E, for example, is set to "0". As a result, the feedback control term (FB current "Ib") of the command current "I" is reduced to suppress an increase in the actual drive velocity "Va". At the same time, a suitable amount of feed-forward control term (FF current "If" ) of the command current "I" is secured so that a loss of synchronism that would be otherwise caused by an excessively reduced command current "I" can be avoided or suppressed as much as possible.

(3) Regions C, D, E

If the velocity deviation "ΔV" is equal to or greater than "0" but is less than the predetermined value "ΔV1", the feedback gain "K" is set to one of the predetermined values K2, K3, K4 corresponding to the regions C, D, E that are defined depending upon the size of the air gap "G". That is, in the regions C, D, E, the feedback gain "K" is set to greater values as the air gap "G" increases. Assuming that the same exciting current is supplied to the electromagnet 61 or 62, the magnitude of the electromagnetic force that acts on the armature 28 is reduced with an increase in the air gap "G". In general, the magnitude of the electromagnetic force is inversely proportional to the size of the air gap "G".

In the regions C, D, E, the feedback gain "K" is set to larger values as the air gap G increases, so as to cause the electromagnet 61 or 62 to generate an appropriate magnitude of electromagnetic force in accordance with the size of the air gap "G". Thus, the actual drive velocity "Va" can be controlled to reliably follow the target drive velocity "Vt" to be equal to this value "Vt" in a relatively short time.

In step 160 in the flowchart of FIG. 7, the feedback gain "K" is set to one of the predetermined values K1 to K5 based on the air gap "G" and the velocity deviation "ΔV", and then the FB current "Ib" is determined from the above-indicated expression (3).

This embodiment yields the advantages (1) to (4) as described above in conjunction with the first embodiment, and yields an additional advantage as follows.

(5) Since the feedback gain is set to greater values as the air gap increases, an appropriate magnitude of the electromagnetic force that is suitable for the size of the air gap can be generated at the electromagnet 61 or 62. Thus, the actual drive velocity can be controlled to reliably follow the target drive velocity to be equal to this target value in a relatively short time.

Third Embodiment

A third embodiment of the invention will be described mainly with regard to differences of this embodiment from the first and second embodiments.

In the second embodiment, the feedback gain K is set to one of different values corresponding to the regions A to E that are defined depending upon the air gap "G" and the velocity deviation "ΔV". Therefore, even if there is a strong non-linearity in the relationship between the air gap "G" and the magnitude of the electromagnetic force that acts on the engine valve, an approximately linear relationship can be established between the air gap "G" and the electromagnetic force in each of the regions A–E, and the feedback gain "K" can be thus set to an optimal value in each region A–E.

Although the aforementioned gain scheduling is effective to cause the actual drive velocity "Va" to quickly follow and coincide with the target drive velocity Vt, the gain scheduling requires a correlating or matching operation for pre-setting an optimal feedback gain K for each region.

In the third embodiment, therefore, a physical model is constructed which includes the engine valve drive velocity as a model variable. By using the physical model, a required value of electromagnetic force needed to make the actual drive velocity "Va" equal to the target drive velocity "Vt" is calculated. More specifically, an equation of motion that simulates the behavior of an engine valve during the opening and closing thereof is determined. Based on the equation of motion, a response analysis of the engine valve is conducted so as to calculate the aforementioned required value of the electromagnetic force.

Figure 10:
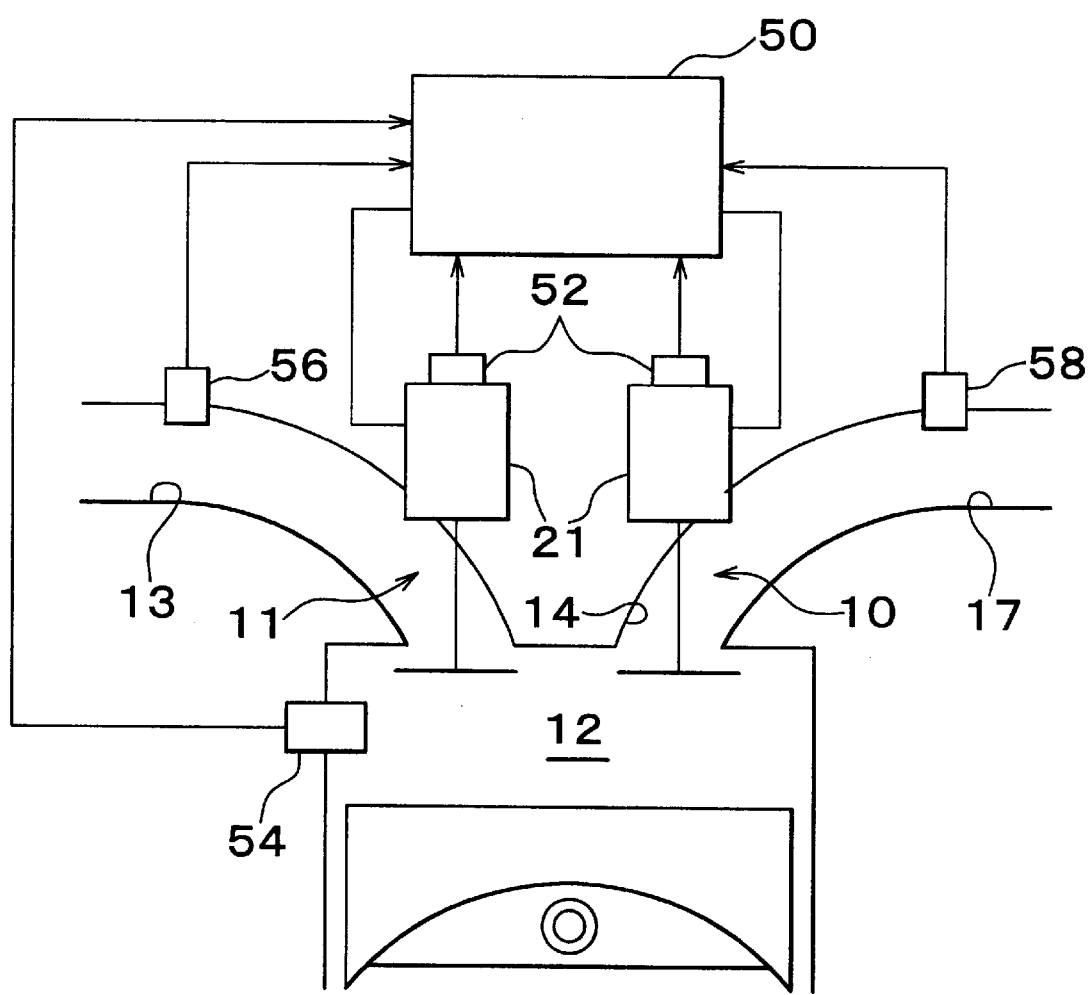
FIG. 10 is a schematic diagram illustrating the construction of an internal combustion engine that employs a valve drive control apparatus according to a third embodiment of the invention.

FIG. 10 illustrates an internal combustion engine that employs a drive control apparatus for controlling engine valves (an intake valve 11 and an exhaust valve 10) according to the third embodiment. The engine of FIG. 10 includes an in-cylinder pressure sensor 54 that detects the pressure in the combustion chamber (which will be called "in-cylinder pressure"), an intake pressure sensor 56 that detects the internal pressure of an intake passage 13 (which will be called "intake pressure"), and an exhaust pressure sensor 58 that detects the internal pressure of an exhaust passage 17 (which will be called "exhaust pressure"). The intake pressure sensor 56 may also be used as a sensor for detecting the amount of the intake air, or the flow rate of the intake air, based on the intake pressure and the engine speed, during the air-fuel ratio control, for example. Furthermore, the in-cylinder pressure sensor 54, which is used for estimating an external force that acts on each engine valve, may be eliminated if the internal combustion engine is equipped with a combustion pressure sensor that detects the combustion pressure, namely, the maximum in-cylinder pressure during the combustion stroke. In this case, the combustion pressure sensor also performs the function of the in-cylinder pressure sensor 54.

Figure 11:
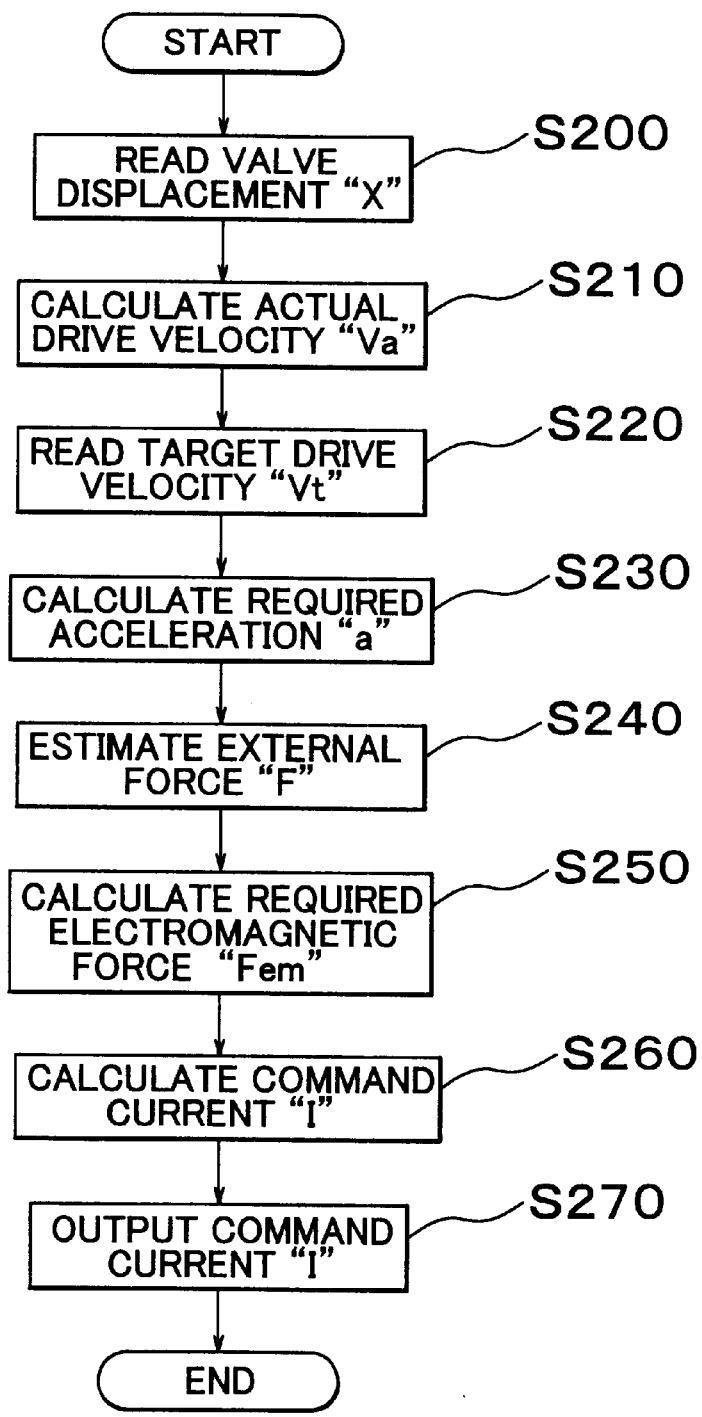
FIG. 11 is a flowchart illustrating a procedure of valve drive control according to the third embodiment of the invention.
Figure 12:
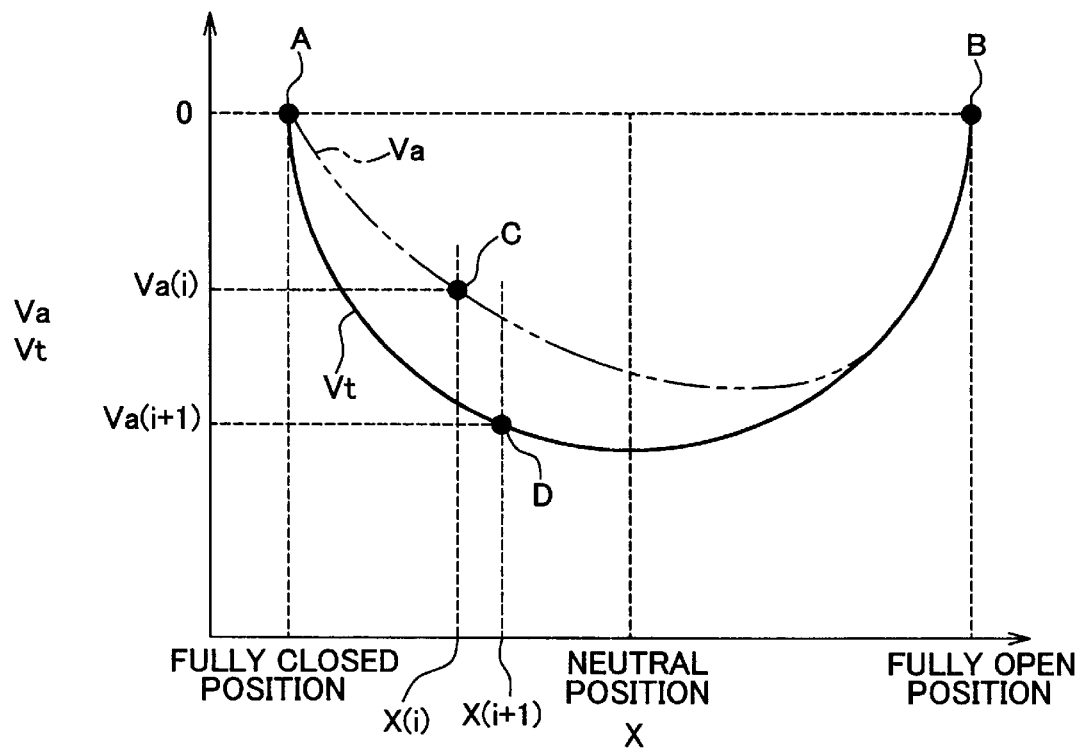
FIG. 12 is a graph showing changes of the actual drive velocity and the target drive velocity with the valve displacement.

A procedure of calculating a required value of electromagnetic force in an exemplary case in which the exhaust valve 10 is opened and closed will be described with reference to the flowchart shown in FIG. 11 and the graph as shown in FIG. 12.

The process as illustrated in the flowchart of FIG. 11 is implemented after the supply of hold current to one of the upper and lower coils 42, 46 is stopped upon opening or closing the exhaust valve 10 (for example, after time t1 or time t6 in FIG. 2). The process is repeatedly executed by the electronic control unit 50 in at predetermined time intervals Δt. FIG. 12, which is similar to FIG. 6, indicates the actual drive velocity "Va" and the target drive velocity "Vt" in relation to the valve displacement "X". In the following, there will be described the case where the target drive velocity "Vt" changes from point A to point B via point D along a solid line in FIG. 12 as the exhaust valve 10 is opened.

In the process of FIG. 11, step 200 is initially executed to read the valve displacement "X(i)" in the current control cycle based on a detection signal from the displacement sensor 52. Step 210 is then executed to calculate an actual drive velocity "Va(i)" (that corresponds to point C in FIG. 12) according to the above-indicated expression (1). In order to reduce the influence of noise on the detection signal of the displacement sensor 52, it is preferable to perform a filtering process, such as a first-order lag process, for removing a high-frequency component(s) emphasized by the noise, on the actual drive velocity "Va" calculated as described above.

Subsequently, step 220 is executed to estimate a valve displacement "X(i+1)" to be attained in the next control cycle according to the following expression (6), and read a target drive velocity "Vt(i+1)" (refer to point D in FIG. 12) corresponding to the valve displacement "X(i+1)" based on the relationship between the valve displacement "X" and the target drive velocity "Vt" as indicated in FIG. 12.

$$X_{(i+1)} = X_{(i)} + Va_{(i)} \cdot \Delta t \quad (6)$$

Next, a required value of acceleration (required acceleration "a") of the exhaust valve needed to make the actual drive velocity "Va" (=Va(i)) of the exhaust valve 10 equal to the target drive velocity "Vt" (=Vt(i+1)) is calculated in step 230 according to the following expression (7).

$$a = (Vt_{(i+1)} - Va_{(i)})/\Delta t \quad (7)$$

After the required acceleration "a" is calculated, an external force "F" that acts on the exhaust valve 10 is estimated in step 240 according to the following expression (8).

$$F = fa - fb \quad (8)$$

In the above expression (8), "fa" represents the force that acts on the exhaust valve 10, and particularly, on the valve body 16, in accordance with a pressure difference between the in-cylinder pressure and the exhaust pressure. For example, "fa" is calculated according to the following expression (9). For the estimation of an external force that acts on the intake valve 11 as an engine valve, the intake pressure detected by the intake pressure sensor 56 is used in place of the exhaust pressure as described below.

$$fa = K1 \cdot (Pc - Pe) \quad (9)$$

K1: constant
Pc: in-cylinder pressure
Pe: exhaust pressure

Furthermore, in the above expression (8), "fb" represents frictional resistance at various sliding portions of the exhaust valve 10, and is set to a constant value that is predetermined through experiments or the like. Since the magnitude of the frictional resistance changes depending upon the state of lubrication at each sliding portion, in particular, upon the temperature of the lubricant, the frictional resistance "fb"

may be estimated or determined as a function of the engine temperature. For example, the frictional resistance "fb" is set to larger values as the engine temperature (estimated from, e.g., the temperature of the engine cooling water) is lower.

By modeling the exhaust valve 10 as a spring-mass vibration system, an equation of motion (10) as indicated below is obtained. In the following expression (10), the valve displacement "X(i)" is equal to 0 at a reference position when the exhaust valve 10 is positioned at the aforementioned neutral position.

$$m \cdot a + c \cdot Va_{(i)} + k \cdot X_{(i)} = F + Fem \qquad (10)$$

In the above expression (10), "m" represents the mass of the vibration model, and is set based on, for example, the mass of the movable portion of the exhaust valve 10, and "c" represents the damping coefficient of the vibration model, and is set based on, for example, the resisting force generated at various sliding portions of the exhaust valve 10 depending upon the sliding speed thereof. Furthermore, "k" represents the spring coefficient of the vibration model, and is set based on the elastic characteristics of the upper spring 38 and the lower spring 24, and "Fem" represents a required value of the electromagnetic force of the electromagnet 61 or 62 needed to make the actual drive velocity "Va" of the exhaust valve 10 equal to the target drive velocity "Vt".

From the equation of motion (10), an expression (11) as indicated below is derived. In step 250, the required electromagnetic force value "Fem" is calculated according to the expression (11).

$$Fem = m \cdot a + c \cdot Va_{(i)} + k \cdot X_{(i)} - F \qquad (11)$$

Figure 13:
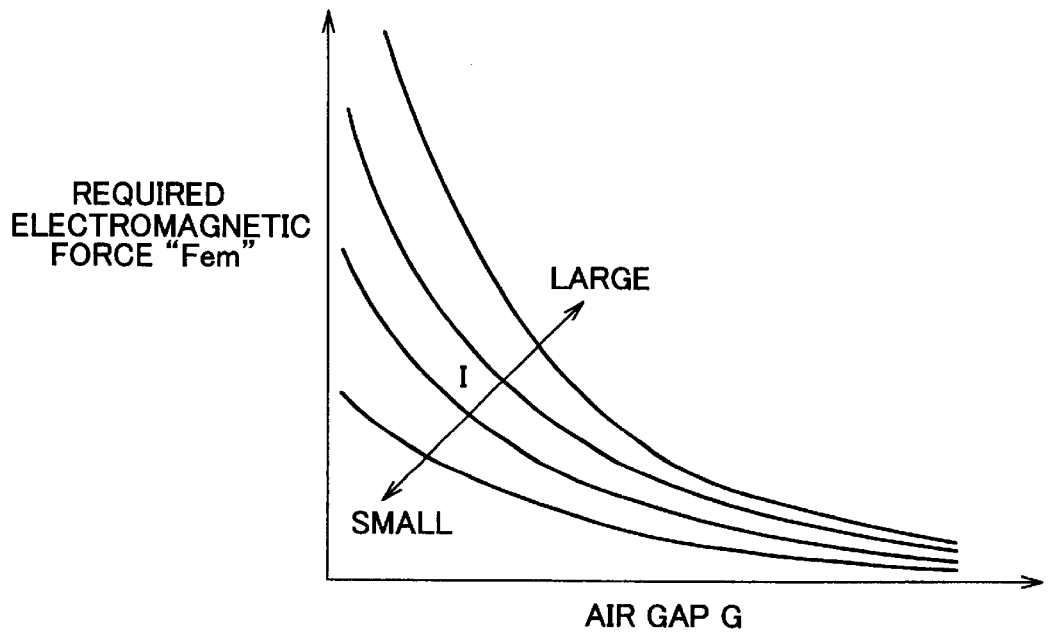
FIG. 13 is a graph indicating a relationship among the required acceleration, the air gap, and the command current "I"

Subsequently, step 260 is executed to calculate the command current "I" supplied to the coil 42, 46 of the electromagnet 61, 62 based on the required electromagnetic force "Fem". FIG. 13 shows a map that is referred to when calculating the command current "I". The map indicates a relationship among the required electromagnetic force "Fem", the air gap "G" and the command current "I". The relationship indicated in this map is pre-stored as function data in the memory of the electronic control unit 50.

As indicated in FIG. 13, the command current "I" is set to greater values as the required electromagnetic force "Fem" increases and the air gap "G" increases. The command current "I" is set as indicated in the map of FIG. 13 since a relationship as represented by expression (12) below is established among the required electromagnetic force "Fem", the air gap "G" and the command current "I".

$$Fem \, (I/G)^2 \qquad (12)$$

After the command current "I" is thus calculated, step 270 is executed to apply the command current "I" to a selected one of the electromagnets 61, 62. More specifically, the command current "I" is supplied to the lower coil 46 when the exhaust valve 10 is to be opened, and the command current "I" is supplied to the upper coil 42 when the exhaust valve 10 is to be closed. After the magnitude of the electromagnetic force of each of the electromagnets 61, 62 is controlled through control of current applied to each electromagnet 61, 62 in this manner, the process of FIG. 11 is once terminated.

The third embodiment, in which driving of the engine valve is controlled in the above manner, yields the advantages (2) to (4) stated above in conjunction with the first embodiment, and further yields an advantage as follows.

(6) Even in the case where the external force that acts on the engine valve changes depending upon the engine load, the engine valve is driven with suitable electromagnetic force that is controlled in accordance with the engine load, so as to assure opening and closing characteristics that are equivalent to those obtained when there is no engine load.

Furthermore, using a model in which the engine valve is modeled as a spring-mass vibration system, the opening and closing behavior of the engine valve is simulated in order to calculate a required value of the electromagnetic force. Therefore, it is not necessary to perform a correlating or matching operation in advance so as to empirically obtain a relationship between the engine load and the electromagnetic force suitable for the engine load through experiments, or the like. Accordingly, the correlating operation with respect to control constants can be greatly simplified. Still further, the modeling of the engine valve as described above eliminates the need to set an optimal feedback gain in accordance with the air gap, thus further simplifying the correlating operation.

Fourth Embodiment

A fourth embodiment of the invention will be described mainly with regard to differences of this embodiment from the third embodiment.

In the third embodiment, the actual drive velocity "Va" is calculated based on the above-indicated expression (1) (in step 210 in FIG. 11). Also, the force that acts on the engine valve in accordance with the engine load, namely, the force that acts on the exhaust valve 10 in accordance with a pressure difference between the in-cylinder pressure and the exhaust pressure, or the force that acts on the intake valve 11 in accordance with a pressure difference between the in-cylinder pressure and the intake pressure, is estimated (in step 240 in FIG. 11) based on the in-cylinder pressure, the exhaust pressure and the intake pressure detected by the pressure sensors 54, 56, 58, respectively.

In the fourth embodiment, on the other hand, an observer is set which observes an internal state of the engine valve based on a vibration model of a spring-mass system used for simulating the opening and closing behavior of the engine valve. The observer is used for estimating an actual drive velocity of the engine valve, and also estimating a resultant force, which is a sum of the force that acts on the engine valve due to the pressure difference between the in-cylinder pressure and the exhaust pressure or the intake pressure, and the frictional resistance at the sliding portions of the engine valve. Accordingly, the in-cylinder pressure sensor 54 and the exhaust pressure sensor 58, out of the aforementioned pressure sensors 54, 56, 58, are omitted or eliminated from the engine valve drive control apparatus according to this embodiment.

A procedure of estimating the external force that acts on an engine valve, for example, the exhaust valve 10 in this case, by means of the aforementioned observer will be described below.

By modeling the exhaust valve 10 as a spring-mass vibration system, an equation of motion (13) is obtained. In the equation of motion (13), the parameters "m", "c" and "k" are the same as those as defined in the aforementioned expression (10). Also, "x" represents a valve displacement of the exhaust valve 11, and "u" represents a control input applied to the vibration model, namely, the electromagnetic force of each electromagnet 61, 62. Furthermore, "w" represents an external force that acts on the exhaust valve 10, which is a resultant force that is a sum of the force "fa" that acts on the exhaust valve 10 due to the pressure difference between the in-cylinder pressure and the exhaust pressure, and the frictional resistance "fb" that arises at the sliding portions of the exhaust valve 10.

$$m\cdot\ddot{x}+c\cdot\dot{x}+k\cdot x=w+u \tag{13}$$

Here, a state variable "X" is defined as indicated in the following expression (14).

$$X = \begin{pmatrix} x \\ \dot{x} \\ w \end{pmatrix} \tag{14}$$

From the above-indicated expressions (13) and (14), the state equation (15) is obtained with respect to the vibration model of the exhaust valve 10.

$$\dot{X}=A\cdot X+B\cdot u \tag{15}$$

$$A = \begin{pmatrix} 0 & 1 & 0 \\ -\dfrac{k}{m} & -\dfrac{c}{m} & \dfrac{1}{m} \\ 0 & 0 & 0 \end{pmatrix}$$

$$B = \begin{pmatrix} 0 \\ \dfrac{1}{m} \\ 0 \end{pmatrix}$$

An output equation with respect to the vibration model of the exhaust valve 10 is given as indicated in the following expression (16).

$$Y=C\cdot X \tag{16}$$

C=(100)

Next, an observer for determining an estimated value "Z" of the valve displacement "X" is written as indicated in the following expression (17). In the expression (17), "L" represents an observer gain.

$$\dot{Z}A\cdot Z+B\cdot u+L(Y-C\cdot Z) \tag{17}$$

$$Z = \begin{pmatrix} \overline{x} \\ \overline{\dot{x}} \\ \overline{w} \end{pmatrix} \left( \overline{x}, \overline{\dot{x}}, \overline{w} \text{ are estimated values of } x, \dot{x}, w, \text{ respectively.} \right)$$

An estimated error "e" between the valve displacement "X" and an estimated value "Z" thereof (e=X−Z) can be determined from the following expression (18) derived from the above-indicated expressions (15) to (17).

$$\dot{e}=(A-L\cdot C)e \tag{18}$$

By suitably designing the observer gain "L" so that the estimated error "e" determined according to the expression (18) converges or settles to "0", the estimated value "Z" can be determined from the above expression (17). In other words, it becomes possible to estimate the drive velocity (actual drive velocity "Va") of the exhaust valve 10. If the control input "u" is set to "0" in the above-indicated expressions (15) and (17), for example, the external force "w" can be estimated. The thus estimated external force "w" includes the electromagnetic force of each electromagnet 61, 62, in addition to the force "fa" that acts on the exhaust valve 10 due to the pressure difference between the in-cylinder pressure and the exhaust pressure, and the frictional resistance "fb". Therefore, by subtracting the electromagnetic force currently generated at the electromagnet 61 or 62 from the estimated external force "w", it is possible to estimate the resultant force "F" of the frictional resistance "fb" and the force "fa" that acts on the valve due to the pressure difference between the in-cylinder pressure and the exhaust pressure.

In this embodiment, the required acceleration "a" is calculated (in step 230 in FIG. 11) from the actual drive velocity "Va" of the exhaust valve 10 estimated through the use of the observer and the target drive velocity "Vt" set based on the map shown in FIG. 12, and the required electromagnetic force "Fem" is calculated (in step 250) based on the required acceleration "a" and the external force "F" estimated through the observer. Subsequently, the command current I is calculated (in step 260) based on the required electromagnetic force "Fem". Then, the command current "I" is applied to a selected one of the electromagnets 61, 62 (in step 270).

The fourth embodiment, in which driving of the engine valve is controlled in the above-described manner, yields substantially the same advantages as those of the third embodiment, and further yields advantages as follows.

(7) The observer that observes an internal state of the engine valve is set based on the vibration model of the spring-mass system that simulates the opening and closing behavior of the engine valve is set. Since the external force that acts on the engine valve is estimated by using the observer, there is no need to newly provide sensors, such as an in-cylinder pressure sensor and an exhaust pressure sensor, for estimating the external force. Hence, the construction of the engine valve drive control apparatus can be simplified.

(8) Even in the case where the frictional resistance at the sliding portions of the engine valve changes depending upon, for example, the engine temperature, not to mention the force that changes depending upon the engine load, the external force can be accurately estimated in accordance with variations in the frictional resistance. Thus, the external force can be estimated with improved accuracy, whereby the actual drive velocity can be more favorably controlled to quickly follow the target drive velocity to coincide with the target value in a short time.

(9) According to the above-indicated expression (1), the actual drive velocity of the engine valve is calculated by differentiating the detection signal of the displacement sensor 52. In this case, if noise is mixed into the detection signal of the displacement sensor 52, the influence of the noise is emphasized by the differentiation process, and therefore the accuracy with which the actual drive velocity is calculated tends to be reduced. In this respect, this embodiment utilizes the observer for estimating the actual drive velocity of the engine valve as well as the external force. This makes it possible to reduce an adverse influence of the noise, and control the drive velocity of the engine valve so that the actual drive velocity quickly follows the target drive velocity to coincide with the target value in a short time.

Fifth Embodiment

A fifth embodiment of the invention will be described mainly with regard to differences of this embodiment from the third embodiment.

The fifth embodiment differs from the third embodiment in that a physical model of the engine valve is described based on an equation of conservation of energy instead of the equation of motion. More specifically, an amount of actual kinetic energy of the engine valve is calculated based on the actual drive velocity of the engine valve while an amount of target kinetic energy of the engine valve is calculated based on the target drive velocity, and a deviation of the actual kinetic energy amount from the target kinetic energy amount is calculated. Furthermore, a required value of electromagnetic force is calculated based on the energy amount deviation and the equation of conservation of energy with regard to the engine valve. Among the respective pressure sensors 54, 56, 58, the in-cylinder pressure sensor 54 and the exhaust pressure sensor 58 are omitted or eliminated from an engine valve drive control apparatus according to this embodiment of the invention.

A procedure of calculating the required electromagnetic force in an exemplary case where the exhaust valve 10 is opened and closed will be described with reference to the flowchart shown in FIG. 14.

Figure 14:
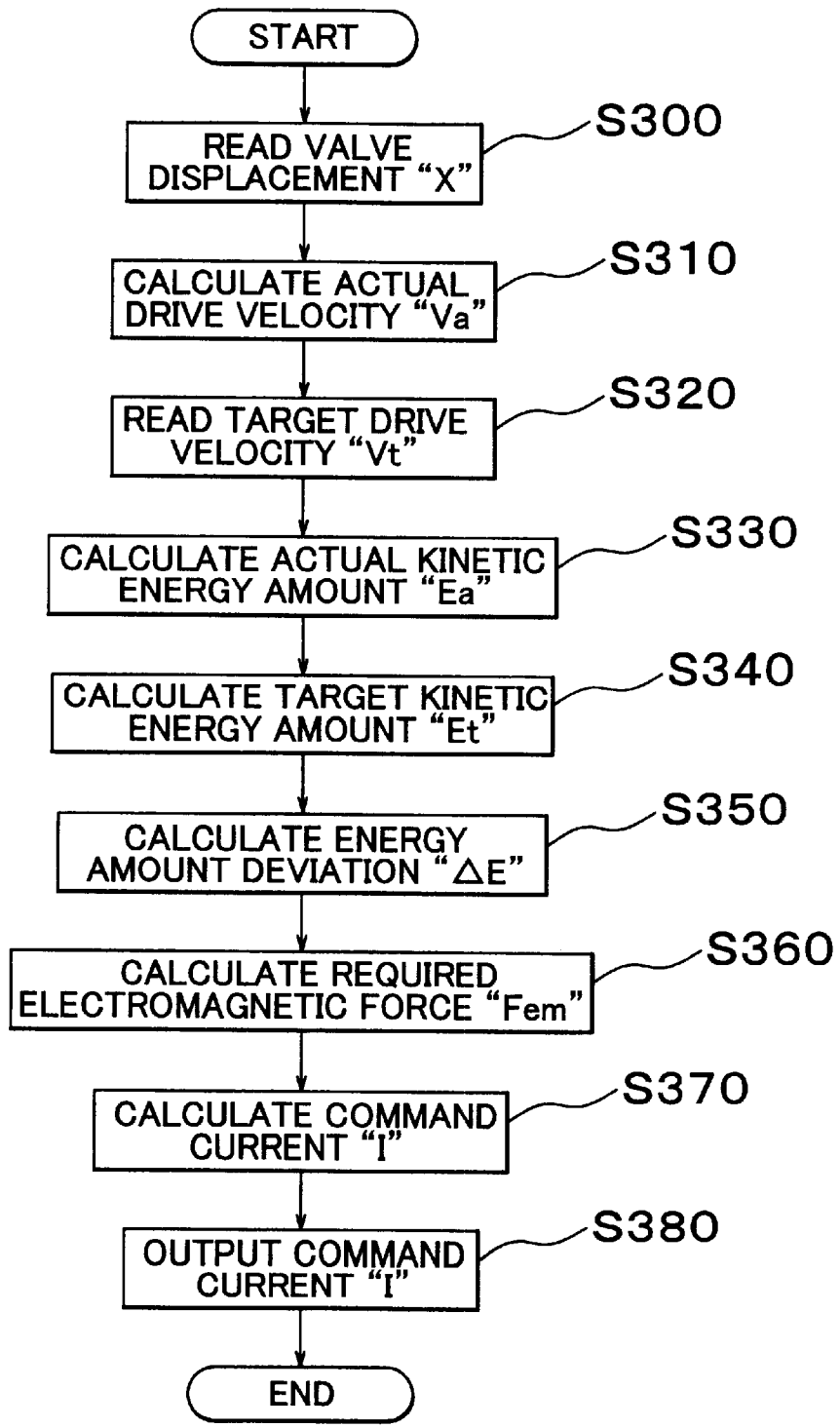
FIG. 14 is a flowchart illustrating a procedure of valve drive control according to a fifth embodiment of the invention.

A series of steps as illustrated in the flowchart of FIG. 14 are executed after the supply of hold current to the upper or lower coil 42 or 46 is stopped upon opening or closing of the exhaust valve 10 (for example, after time t1 or time t6 in FIG. 2). The process of FIG. 14 is repeatedly executed by the electronic control unit 50 at predetermined time intervals Δt.

Initially, steps 300 to 320 are executed to calculate the actual drive velocity "Va(i)" of the exhaust valve 10 in the current control cycle, and read a target drive velocity "Vt(i+1)" to be achieved in the next control cycle. The contents of the operations of steps 300 to 320 are the same as those of steps 200 to 220 in FIG. 11, and therefore will not be described herein.

Step 330 is then executed to calculate an actual kinetic energy amount "Ea" of the exhaust valve 10 in the current control cycle according to the following expression (19).

$$Ea=(½)m \cdot Va^2(i)+(½) k \cdot X^2(i) \qquad (19)$$

The first term in the right-hand side of the expression (19) is the amount of kinetic energy of the modeled exhaust valve 10, and "m" in the same term is a coefficient set based on, for example, the mass of the movable portion of the exhaust valve 10. The second term in the right-hand side of the above expression (19) is the amount of elastic energy of the modeled exhaust valve 10, and "k" in the same term is a coefficient set based on the elastic characteristics of the armature 28, the lower spring 24, and the like.

Subsequently, step 340 is executed to calculate a target kinetic energy amount "Et" of the exhaust valve 10 for the next control cycle according to the following expression (20).

$$Et=(½) m \cdot Vt^2(i+1)+(½)k \cdot X^2(i+1) \qquad (20)$$

After the actual kinetic energy amount "Ea" and the target kinetic energy amount "Et" are calculated as described above, step 350 is executed to calculate a deviation "ΔE" of the actual kinetic energy "Ea" from the target kinetic energy "Et" according to the following expression (21).

$$\Delta E=Et-Ea \qquad (21)$$

The deviation "ΔE" of the energy amount varies depending upon the external force that acts on the exhaust valve 10, including the force that acts on the valve 10 depending upon the engine load, and the frictional resistance at sliding portions of the valve 10. Namely, if there is no such external force on the exhaust valve 10, the amount of kinetic energy of the exhaust valve 10 will be always constant and will not change. In an actual operation, however, the amount of kinetic energy of the exhaust valve 10 changes due to the influence of the external force, and a deviation arises between the actual kinetic energy amount "Ea" and the target kinetic energy amount "Et". Therefore, by determining the deviation "ΔE" between the amounts of kinetic energy "Ea" and "Et", and setting a required value of the electromagnetic force based on the deviation "ΔE" of energy amount, it is possible to control electromagnetic force so as to reflect the influence of the external force, without directly determining the magnitude of the external force.

A specific manner of control of electromagnetic force in the above case will be described. In order to make the actual kinetic energy amount "Ea" equal to the target kinetic energy amount "Et" in the next control cycle, the amount of work "Fem(X(i+1)−X1(i))" that is done by use of the electromagnetic force of the electromagnet 61, 62 during a period between the current control cycle and the next control cycle, that is, the amount of energy given to the exhaust valve 10 during that period, needs to be equal to the deviation ΔE of energy amount that occurs due to the external force acting on the exhaust valve 10. Namely, the relationship as represented by the following expression (22) needs to be established between the deviation "ΔE" and the aforementioned amount of work Fem(X(i+1)−X1(i)).

$$\Delta E=Fem(X(i+1)-X1(i)) \qquad (22)$$

Accordingly, the required electromagnetic force "Fem" is finally calculated in step 360 based on the expression (23) that is derived from the expression (22).

$$Fem=\Delta E/(X(i+1)-X1(i)) \qquad (23)$$

After the required electromagnetic force "Fem" is calculated in this manner, steps 370 and 380 are executed to calculate the command current "I" supplied to the upper or lower coil 42, 46 of the electromagnet 61, 62, and apply the thus obtained command current "I" to a selected one of the electromagnets 61, 62. The contents of the operations of steps 370, 380 are the same as those of steps 260, 270 in FIG. 11, and will not be described herein.

The fifth embodiment, in which driving of the engine valve is controlled in the above-described manner, yields substantially the same advantages as those of the third embodiment, and further yields an advantage as described below, which is substantially the same as the advantage (7) of the fourth embodiment.

(10) In the fifth embodiment, the required electromagnetic force is calculated by using the equation of conservation of energy with regard to the engine valve. In this calculation, the magnitude of the energy amount deviation reflects the influences of external forces that act on the engine valve, including the force that acts on the valve depending upon the engine load and the frictional resistance at the sliding portions of the valve. Thus, there is no need to directly calculate the external force. This makes it unnecessary to newly provide a sensor or sensors, such as an in-cylinder pressure sensor and an exhaust pressure sensor, for estimating the external force, which may lead to further simplification of the construction of the engine valve drive control apparatus.

The invention may also be carried out by changing or modifying the embodiments as illustrated above.

In the second embodiment, the feedback gain "K" is variably set to one of the predetermined values "K1" to "K5" corresponding to the regions A to E that are defined in accordance with the feedback gain "K" and the air gap "G". It is, however, possible to select a manner of setting the feedback gain "K" as desired. For example, the feedback gain "K" may be set based solely on the air gap "G" such that the feedback gain "K" stepwise increases as the size of the air gap "G" increases. Alternatively, the feedback gain "K" may be set so as to continuously change in accordance with the air gap "G", by using the following expression (24) instead of a map.

$$K=Ka\cdot G+Kb \tag{24}$$

G: air gap
Ka, Kb: constants

While the feedback gain "K" is set to the predetermined value "K1" in the region "A" in the second embodiment, it is possible to set the feedback gain "K" to a value that is greater than the predetermined value "K1" in the region "A" when the air gap "G" is small, namely, when the exhaust valve 10 is close to the fully open position or the fully closed position. Namely, if the velocity deviation "ΔV" is greater than the predetermined value "ΔV1" when the exhaust valve 10 is approaching the fully open position or the fully closed position, the actual drive velocity "Va" may become 0 before the exhaust valve 10 reaches the fully open position or the fully closed position, resulting in a loss of synchronism. By setting the feedback gain "K" in the above-described manner, such a loss of synchronism is avoided as much as possible.

In the first and second embodiments, both the feedback control and the feed-forward control are carried out by setting the command current "I" to be applied to the electromagnet 61 or 62, based on the FB current "Ib" and the FF current "If". It is, however, also possible to perform the feedback control alone, for example, to apply only the FB current "Ib" to a selected one of the electromagnets 61, 62.

While only the P term (proportional term) of the PID control is calculated when calculating the FB current "Ib" based on the velocity deviation "ΔV" in the first and second embodiments, it is also possible to calculate the I term (integral term) and the D term (differential term) as well.

While the feedback control is started when the air gap "G" decreases to or below the predetermined value "G1" in the illustrated embodiments, it is also practicable to always perform the feedback control regardless of the size of the air gap "G".

While the velocity deviation "ΔV" between the actual drive velocity "Va" and the target drive velocity "Vt" is calculated as a parameter that indicates the degree of separation between the actual drive velocity "Va" and the target drive velocity "Vt" in the first and second embodiments, it is also possible to evaluate the degree of separation using the ratio of the actual velocity "Va" to the target velocity "Vt", i.e., Va/Vt.

In the third embodiment, the required acceleration "a" is calculated based on the actual drive velocity "Va(i)" in the current control cycle and the target drive velocity "Vt(i+1)" (estimated value) corresponding to the valve displacement "X(i+1)" (estimated value) for the next control cycle, it is also possible to calculate the required acceleration "a" based on the actual drive velocity "Va(i)" in the current control cycle and the target drive velocity "Vt(i)" corresponding to the valve displacement "X(i)" (actually measured value) in the current control cycle.

In the third embodiment, the force that acts on the exhaust valve 10 in accordance with the engine load is estimated based on the pressure difference between the in-cylinder pressure and the exhaust pressure. Here, it is to be noted that the in-cylinder pressure greatly changes in accordance with the operating state of the engine whereas the exhaust pressure does not change so much as compared with the in-cylinder pressure. Therefore, the exhaust pressure may be regarded as a constant pressure, and the force that acts on the exhaust valve 10 may be estimated based solely on the in-cylinder pressure. Furthermore, since the in-cylinder pressure and the exhaust pressure are related with each other, the exhaust pressure may be estimated based on the in-cylinder pressure. In this case, the exhaust pressure sensor 58 may be eliminated, and the construction of the drive control apparatus can be simplified.

While the intake pressure used for the estimation of the exhaust pressure is directly detected by the intake pressure sensor 56, the intake pressure may be estimated based on, for example, the amount of intake air (or the flow rate of intake air) detected by an air flow meter, the engine speed, and other parameters.

While the required electromagnetic force "Fem" is calculated based on the above-indicated expression (23) in the fifth embodiment, it is also possible to estimate the external force acting on the engine valve in the current control cycle, and to add the force that cancels out the estimated external force, that is, the force applied in the direction opposite to the direction of the estimated external force, to the value obtained from the expression (23), and set the result of the addition as the required electromagnetic force value "Fem". With this arrangement, the energy amount deviation caused by the external force is cancelled out in a feed-forward manner by the canceling force, so that the actual drive velocity "Va" follows the target drive velocity "Vt" with improved accuracy to coincide with the target value in a relatively short time. In this modified example, the external force may be estimated based on the detection signals from the pressure sensors 54, 55, 58 as described above in the third embodiment, or may be estimated by using an observer as in the fourth embodiment.

While the command current "I" is calculated based on the graph of FIG. 13 in the third to fifth embodiments, the command current "I" may be calculated by any other method provided that the command current "I" is set to greater values with increases in the required electromagnetic force "Fem" and in the size of the air gap "G". For example, the command current "I" may be calculated based on a function expression (25) by way of example.

$$I=Kc\cdot G\cdot \sqrt{Fem}+Kd \tag{25}$$

where Kc, Kd: constants.

What is claimed is:

1. A drive control apparatus for controlling driving of an engine valve of an internal combustion engine based on an electromagnetic force generated by at least one electromagnet, comprising:

a setting unit that sets a target drive velocity of the engine valve in accordance with a displacement of the engine valve, such that the target drive velocity corresponds to a velocity of the engine valve when there is no engine load; and a control unit that controls a magnitude of the electromagnetic force by controlling current applied to the at least one electromagnet, depending upon a degree of separation between an actual drive velocity of the engine valve and the target drive velocity, so that the actual drive velocity is made substantially equal to the target drive velocity set by the setting unit.

2. A drive control apparatus according to claim 1, wherein the engine valve is able to displace between a first position and a second position, and wherein a magnitude of the target drive velocity is set to a minimum when the engine valve reaches one of the first position and the second position during displacement thereof.

3. A drive control apparatus according to claim 1, wherein:

the internal combustion engine further includes at least one spring that exerts an elastic force on the engine valve, such that the engine valve is driven by the elastic force of the spring in addition to the electromagnetic force of the at least one electromagnet; and the target drive velocity is determined so as to coincide with a velocity of displacement of the engine valve when the engine valve freely oscillates between opposite ends of a stroke thereof under the elastic force of the spring.

4. A drive control apparatus according to claim 1, wherein the control unit comprises:

a feed-forward current setting unit that calculates a feed-forward current for driving the engine valve so that the actual drive velocity is made substantially equal to the target drive velocity when there is no engine load; and a feed-back current setting unit that calculates a feedback current depending upon the degree of separation between the actual drive velocity and the target drive velocity, and wherein the control unit controls exciting current applied to the at least one electromagnet, based on the feed-forward current and the feedback current.

5. A drive control apparatus according to claim 4, wherein the exciting current applied to the at least one electromagnet is substantially equal to a sum of the feed-forward current and the feedback current.

6. A drive control apparatus according to claim 4, wherein when an air gap formed between the engine valve and a selected one of the at least one electromagnet is greater than a predetermined value during a movement of the engine valve toward the selected electromagnet, the feedback current setting unit sets the feedback current to 0 without regard to the degree of separation between the actual drive velocity and the target drive velocity.

7. A drive control apparatus according to claim 4, wherein a feedback gain used when calculating the feedback current increases with an increase in an air gap formed between the engine valve and a selected one of the at least one electromagnet during a movement of the engine valve toward the selected electromagnet.

8. A drive control apparatus according to claim 4, wherein the engine valve is able to displace between a first position and a second position, and wherein a magnitude of the target drive velocity is set to a minimum when the engine valve reaches one of the first position and the second position during displacement thereof.

9. A drive control apparatus according to claim 4, wherein:

the internal combustion engine further includes at least one spring that exerts an elastic force on the engine valve, such that the engine valve is driven by the elastic force of the spring in addition to the electromagnetic force of the at least one electromagnet; and the target drive velocity is determined so as to coincide with a velocity of displacement of the engine valve when the engine valve freely oscillates between opposite ends of a stroke thereof under the elastic force of the spring.

10. A drive control apparatus according to claim 1, wherein:

the control unit comprises an electromagnetic force required value calculating unit that constructs a physical model of the engine valve that includes a drive velocity of the engine valve as a model variable, and calculates a required value of the electromagnetic force that is needed for making the actual drive velocity substantially equal to the target drive velocity, based on the physical model, the actual drive velocity and the target drive velocity; and the control unit controls exciting current applied to the at least one electromagnet based on the electromagnetic force required value calculated by the electromagnetic force required value calculating unit.

11. A drive control apparatus according to claim 10, wherein:

the electromagnetic force required value calculating unit comprises an acceleration required value calculating unit that calculates a required value of an acceleration of the engine valve that is needed for making the actual drive velocity substantially equal to the target drive velocity, and an external force estimating unit that estimates an external force that acts on the engine valve depending upon an engine operating state; and the electromagnetic force required value calculating unit calculates the required value of the electromagnetic force based on the required value of the acceleration calculated by the acceleration required value calculating unit, the external force estimated by the external force estimating unit, and an equation of motion of the engine valve that describes the physical model.

12. A drive control apparatus according to claim 11, wherein the external force estimating unit estimates the external force based on at least one pressure that acts on the engine valve, and a frictional resistance at each sliding portion of the engine valve.

13. A drive control apparatus according to claim 11, wherein the control unit sets an observer that observes an internal state of the engine valve based on a vibration model thereof, and wherein the actual drive velocity of the engine valve and the external force that acts on the engine valve are estimated by using the observer.

14. A drive control apparatus according to claim 10, wherein:

the electromagnetic force required value calculating unit comprises an energy amount deviation calculating unit that calculates an energy amount deviation between an actual energy amount of the engine valve based on the actual drive velocity and a target energy amount of the engine valve based on the target drive velocity; and the electromagnetic force required value calculating unit calculates the required value of the electromagnetic force based on the energy amount deviation, and an equation of conservation of energy of the engine valve that describes the physical model.

15. A drive control apparatus according to claim 10, wherein the engine valve is able to displace between a first position and a second position, and wherein a magnitude of the target drive velocity is set to a minimum when the engine valve reaches one of the first position and the second position during displacement thereof.

16. A drive control apparatus according to claim 10, wherein:

the internal combustion engine further includes at least one spring that exerts an elastic force on the engine valve, such that the engine valve is driven by the elastic force of the spring in addition to the electromagnetic force of the at least one electromagnet; and the target drive velocity is determined so as to coincide with a velocity of displacement of the engine valve when the engine valve freely oscillates between opposite ends of a stroke thereof under the elastic force of the spring.

17. A method for controlling driving of an engine valve of an internal combustion engine based on an electromagnetic force generated by at least one electromagnet, comprising the steps of:

setting a target drive velocity of the engine valve in accordance with a displacement of the engine valve, the target drive velocity corresponding to that of the engine valve when there is no engine load; and controlling a magnitude of the electromagnetic force by controlling current applied to the at least one electromagnet, depending upon a degree of separation between an actual drive velocity of the engine valve and the target drive velocity, so that the actual drive velocity is made substantially equal to the target drive velocity.

* * * * *

UNITED STATES PATENT AND TRADEMARK OFFICE
CERTIFICATE OF CORRECTION

PATENT NO.      : 6,390,039 B2
DATED           : May 21, 2002
INVENTOR(S)     : Toshio Fuwa It is certified that error appears in the above-identified patent and that said Letters Patent is hereby corrected as shown below:

Column 19,
Line 41, change equation (17) to read as follows:
-- $Z=A \cdot Z + B \cdot u + L(Y - C \cdot Z)$ --

Signed and Sealed this

Thirteenth Day of May, 2003

JAMES E. ROGAN
*Director of the United States Patent and Trademark Office*